US012494168B2

(12) United States Patent
Kim et al.

(10) Patent No.: US 12,494,168 B2
(45) Date of Patent: Dec. 9, 2025

(54) PIXEL CIRCUIT AND DISPLAY DEVICE HAVING THE SAME

(71) Applicant: Samsung Display Co., LTD., Yongin-si (KR)

(72) Inventors: Sunghwan Kim, Yongin-si (KR); Wonkyu Kwak, Yongin-si (KR); Jung Hoon Shim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 70 days.

(21) Appl. No.: 18/376,645

(22) Filed: Oct. 4, 2023

(65) Prior Publication Data

US 2024/0274076 A1 Aug. 15, 2024

(30) Foreign Application Priority Data

Feb. 9, 2023 (KR) ........................ 10-2023-0017654

(51) Int. Cl.
*G09G 3/3233* (2016.01)

(52) U.S. Cl.
CPC ... *G09G 3/3233* (2013.01); *G09G 2300/0842* (2013.01); *G09G 2320/0271* (2013.01)

(58) Field of Classification Search
CPC ......... G09G 3/3233; G09G 2300/0842; G09G 2320/0271
See application file for complete search history.

(56) References Cited

U.S. PATENT DOCUMENTS

| | | | | |
|---|---|---|---|---|
| 11,322,087 B1 * | 5/2022 | Beard | .................. | G09G 3/3233 |
| 2024/0049572 A1 * | 2/2024 | Kim | ..................... | H10K 59/124 |

FOREIGN PATENT DOCUMENTS

| | | | | |
|---|---|---|---|---|
| KR | 1020160027907 A | 3/2016 | | |
| KR | 102302802 B1 | 9/2021 | | |
| WO | WO-2022061852 A1 * | 3/2022 | ........... | G09G 3/2007 |

OTHER PUBLICATIONS

Translation of WO-2022061852-A1 (Year: 2022).*

* cited by examiner

*Primary Examiner* — Lixi C Simpson
(74) *Attorney, Agent, or Firm* — CANTOR COLBURN LLP

(57) ABSTRACT

A pixel circuit includes a driving transistor which generates a driving current and including a first electrode connected to a first node, a gate electrode connected to a gate node, and a second electrode connected to a second node, a writing transistor connected to the driving transistor through the first node and including a first electrode which receives a data voltage, a gate electrode which receives a write gate signal, and a second electrode connected to the first node, a compensation transistor including a gate electrode, a first electrode connected to the gate node, and a second electrode connected to the second node, a gate-drain capacitor connected in parallel with the compensation transistor and including a first electrode connected to the gate node and a second electrode connected to the second node, and a light emitting element that emits light based on the driving current.

13 Claims, 22 Drawing Sheets

BML+ACT1+CL1+CL2+ACT2+CL3+CL4+CL5

CL5:US1,US2,US3

T3:T3-1,T3-2
T4:T4-1,T4-2

ACT+CL1'+CL2'+CL3'+CL4'

CL4':US1',US2',US3',US4'

PIXEL CIRCUIT AND DISPLAY DEVICE HAVING THE SAME

This application claims priority to Korean Patent Application No. 10-2023-0017654, filed on Feb. 9, 2023, and all the benefits accruing therefrom under 35 U.S.C. § 119, the content of which in its entirety is herein incorporated by reference.

BACKGROUND

1. Field

The disclosure relates generally to a pixel circuit. More particularly, the disclosure relates to a pixel circuit and a display device having the pixel circuit.

2. Description of the Related Art

With the development of information technology, the importance of a display device, which is a connection medium between a user and information, has been highlighted. For example, various types of display device such as liquid crystal display device ("LCD"), organic light emitting display device ("OLED"), plasma display device ("PDP"), quantum dot display device or the like are widely used in various fields.

SUMMARY

In a display device, at a low gradation, a change amount in current according to a change in a grayscale may be small, and at a high gradation, a change amount in current according to a change in a grayscale may be large. In other words, stains may occur at the low gradation where the change amount in current according to a change in the grayscale is large.

Embodiments provide a pixel circuit that reduces stains.

Embodiments provide a display device with reduced stains.

A pixel circuit according to an embodiment of the disclosure includes a driving transistor which generates a driving current and including a first electrode connected to a first node, a gate electrode connected to a gate node, and a second electrode connected to a second node, a writing transistor connected to the driving transistor through the first node, where the writing transistor includes a first electrode which receives a data voltage, a gate electrode which receives a write gate signal, and a second electrode connected to the first node, a compensation transistor including a gate electrode, a first electrode connected to the gate node, and a second electrode connected to the second node, a gate-drain capacitor connected in parallel with the compensation transistor, where the gate-drain capacitor includes a first electrode connected to the gate node and a second electrode connected to the second node, and a light emitting element which emits light based on the driving current.

In an embodiment, the pixel circuit may further include a first light emitting transistor including a first electrode which receives a driving voltage, a gate electrode which receives a light emitting control signal, and a second electrode connected to the first node and a second light emitting transistor including a first electrode connected to the second node, a gate electrode which receives the light emitting control signal, and a second electrode connected to a third node. In such an embodiment, the first light emitting transistor may be connected to the driving transistor through the first node, and the second light emitting transistor may be connected to the gate-drain capacitor through the second node.

In an embodiment, the gate-drain capacitor may lower a voltage of the gate node by a first change amount in a first mode in which the light emitting element is driven in a first gradation, and may lower the voltage of the gate node by a second change amount in a second mode in which the light emitting element is driven in a second gradation greater than the first gradation. In such an embodiment, the first change amount may be greater than the second change amount.

In an embodiment, the pixel circuit may further include an anode initialization transistor including a first electrode which receives an anode initialization voltage, a gate electrode which receives the write gate signal, and a second electrode connected to the third node and a storage capacitor including a first electrode which receives the driving voltage and a second electrode connected to the gate node. In such an embodiment, the anode initialization transistor may be connected to the light emitting element through the third node, and the storage capacitor may be connected to the gate-drain capacitor through the gate node.

In an embodiment, the pixel circuit may further include a gate initialization transistor including a first electrode which receives a gate initialization voltage, a gate electrode which receives an initialization gate signal, and a second electrode connected to the gate node. In such an embodiment, the gate initialization transistor may be connected to the gate-drain capacitor through the gate node.

In an embodiment, the gate electrode of the compensation transistor may receive the write gate signal. In such an embodiment, each of the compensation transistor and the gate initialization transistor may be a P-channel metal oxide semiconductor ("PMOS") transistor.

In an embodiment, the gate electrode of the compensation transistor may receive a compensation gate signal. In such an embodiment, each of the compensation transistor and the gate initialization transistor may be an N-channel metal oxide semiconductor ("NMOS") transistor.

In an embodiment, the pixel circuit may further include a boost capacitor including a first electrode which receives the write gate signal and a second electrode connected to the gate node and a negative boost capacitor including a first electrode which receives the compensation gate signal and a second electrode connected to the gate node. In such an embodiment, the boost capacitor may be connected to the gate-drain capacitor through the gate node, and the negative boost capacitor may be connected to the gate-drain capacitor through the gate node.

A display device according to an embodiment of the disclosure includes a substrate, a first active pattern disposed on the substrate, a first conductive layer disposed on the first active pattern and including a first storage electrode, a second conductive layer disposed on the first conductive layer and including a second storage electrode overlapping the first storage electrode, a second active pattern disposed on the second conductive layer and including a first capacitor electrode, a third conductive layer disposed on the second active pattern, and a fourth conductive layer disposed on the third conductive layer and including a second capacitor electrode connected to the first storage electrode.

In an embodiment, the second capacitor electrode may overlap the first capacitor electrode. In such an embodiment, the first capacitor electrode and the second capacitor electrode may collectively define a gate-drain capacitor.

In an embodiment, the first conductive layer may further include a first boost electrode, and the second active pattern may further include a second boost electrode overlapping the first boost electrode. In such an embodiment, the first boost electrode and the second boost electrode may collectively define a boost capacitor.

In an embodiment, the first conductive layer may further include a first negative boost electrode, and the third conductive layer may further include a second negative boost electrode overlapping the first negative boost electrode. In such an embodiment, the first negative boost electrode and the second negative boost electrode may collectively define a negative boost capacitor.

In an embodiment, the first storage electrode and the second storage electrode may collectively define a storage capacitor.

In an embodiment, the first active pattern may include a silicon semiconductor, and the second active pattern may include an oxide semiconductor.

A display device according to another embodiment of the disclosure includes a substrate, an active pattern disposed on the substrate and including a first capacitor electrode, a first conductive layer disposed on the active pattern and including a first storage electrode, a second conductive layer disposed on the first conductive layer and including a second storage electrode overlapping the first storage electrode, and a third conductive layer disposed on the second conductive layer and including a second capacitor electrode connected to the first storage electrode.

In an embodiment, the second capacitor electrode may overlap the first capacitor electrode. In such an embodiment, the first capacitor electrode and the second capacitor electrode may collectively define a gate-drain capacitor.

In an embodiment, the first storage electrode and the second storage electrode may collectively define a storage capacitor.

In an embodiment, the active pattern may include a silicon semiconductor.

A pixel circuit according to an embodiment of the disclosure may include a driving transistor including a first electrode connected to a first node, a gate electrode connected to a gate node, and a second electrode connected to a second node and a gate-drain capacitor including a first electrode connected to the gate node and a second electrode connected to the second node.

Accordingly, when driving a frame emission period at a low gradation, a change amount in a voltage of the gate node may be relatively large. In such an embodiment, the change amount in the voltage of the gate node relatively increases at the low gradation period, such that a level variation of a driving current provided to a light emitting element to emit light having a specific grayscale may be reduced.

As a result, in such an embodiment, the gradation of light emitted from the light emitting element may be effectively prevented from rapidly changing at the low gradation period.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
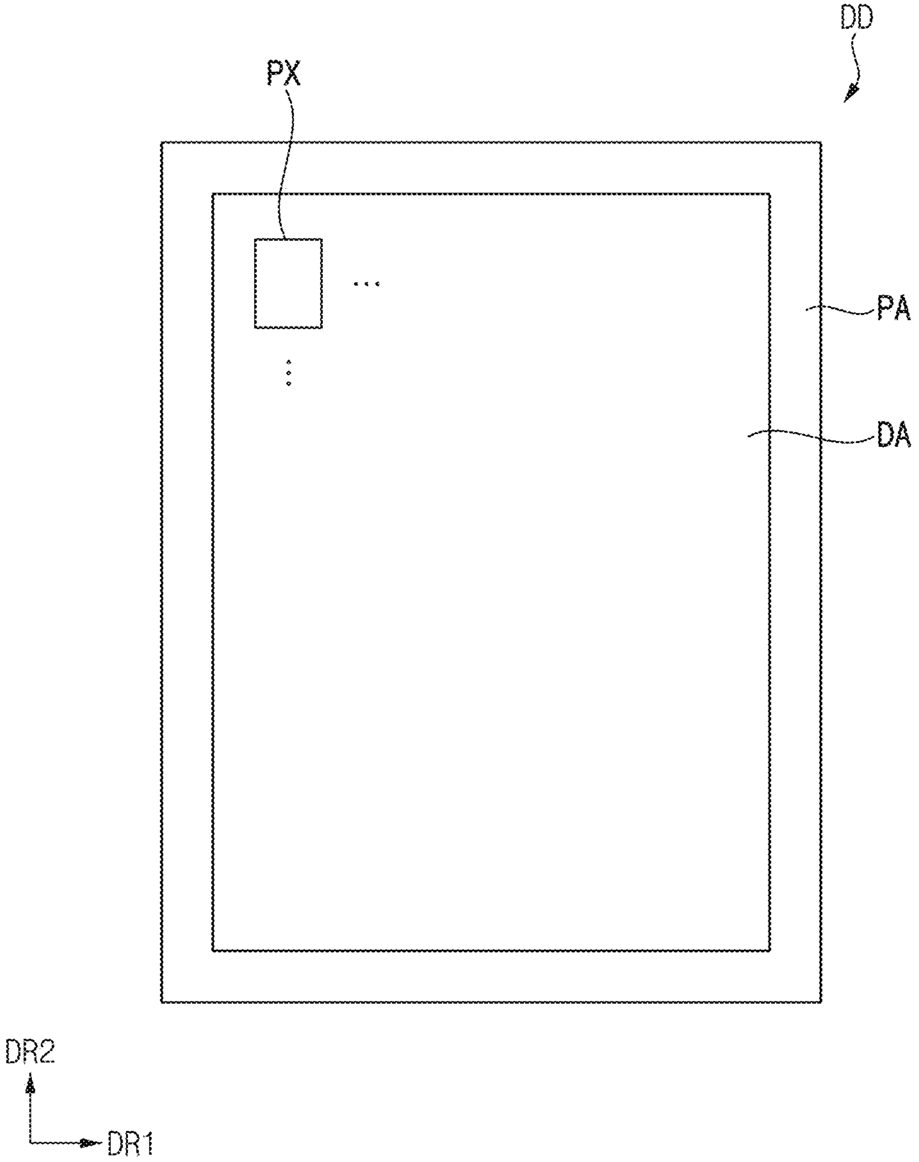
FIG. 1 is a plan view illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings. The same reference numerals are used for the same components in the drawings, and any repetitive detailed descriptions of the same components may be omitted or simplified.

FIG. 1 is a plan view illustrating a display device according to an embodiment of the disclosure.

In this specification, a plane may be defined by a first direction DR1 and a second direction DR2 crossing the first direction DR1. For example, the first direction DR1 and the second direction DR2 may be perpendicular to each other.

Referring to FIG. 1, a display device DD according to an embodiment of the disclosure may include a display area DA and a peripheral area PA. The display area DA may be defined as an area in which an image is displayed by generating light therefrom or adjusting transmittance of light provided from an external light source. The peripheral area PA may be defined as an area in which no image is displayed. In addition, the peripheral area PA may surround at least a portion of the display area DA.

A plurality of pixels PX may be disposed in the display area DA. Each of the pixels PX may emit light. The pixels PX may be repeatedly arranged along the first and second directions DR1 and DR2.

Figure 2:
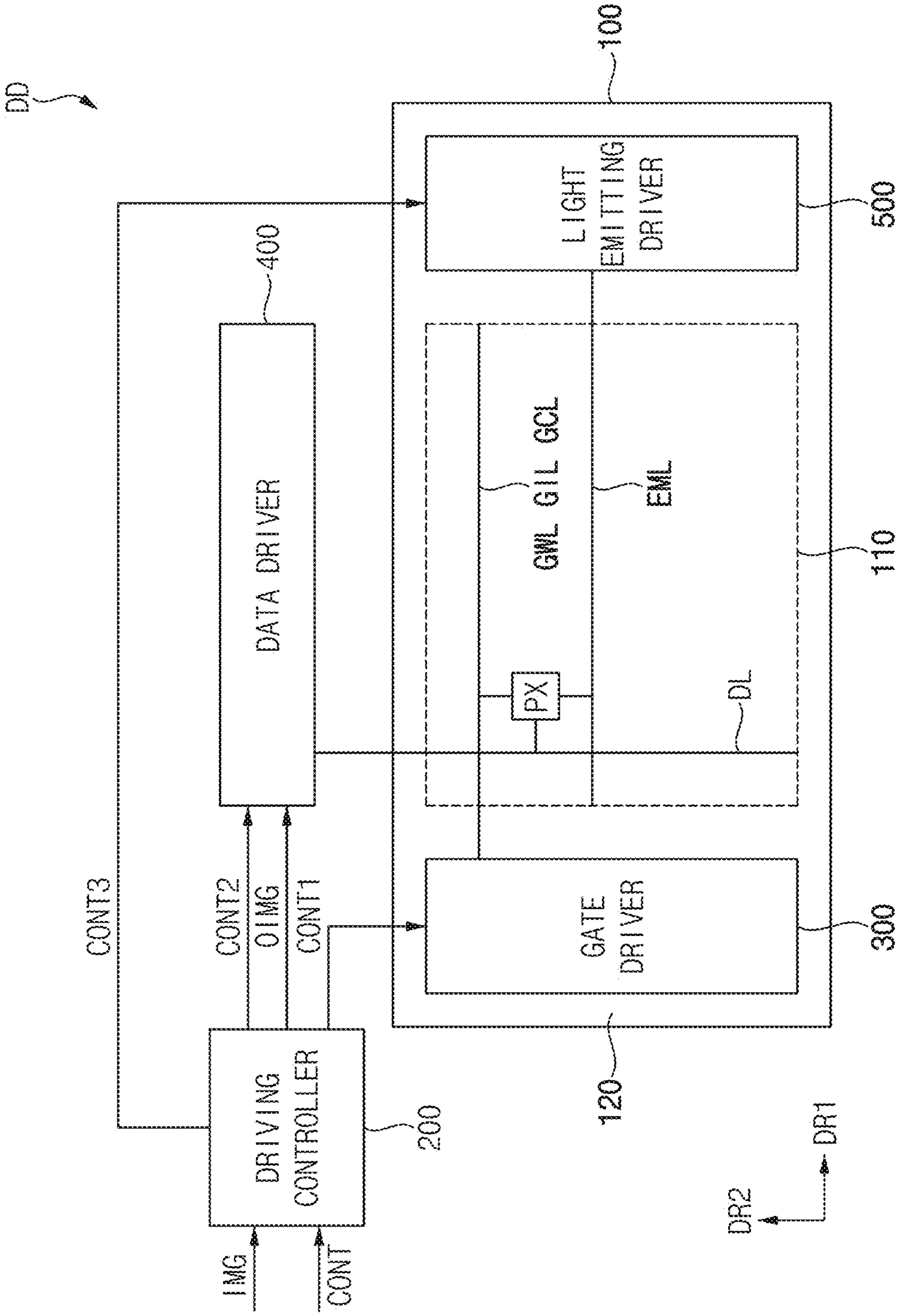
FIG. 2 is a block diagram illustrating the display device of FIG. 1.

FIG. 2 is a block diagram illustrating the display device of FIG. 1.

Referring to FIG. 2, an embodiment of the display device DD may include a display panel 100 and a display panel driver. The display panel 100 may include a display part 110 that displays an image and a peripheral part 120 disposed adjacent to the display part 110. In an embodiment, the peripheral part 120 may include a gate driver 300 and a light emitting driver 500. The display panel driver may drive the display panel 100. The display panel driver may include a driving controller 200 and a data driver 400.

The display panel 100 may include a plurality of gate lines GWL, GIL, and GCL, a plurality of data lines DL, a plurality of light emitting control lines EML, and a plurality of pixels PX electrically connected to the plurality of gate lines GWL, GIL, and GCL, the plurality of data lines DL, and the plurality of light emitting control lines EML.

The gate lines GWL, GIL, and GCL and the light emitting control lines EML may extend in the first direction DR1, and the data lines DL may extend in the second direction DR2.

The driving controller 200 may receive an input image data IMG and an input control signal CONT from a host processor (e.g., a graphic processing unit (GPU)). In an embodiment, for example, the input image data IMG may include red image data, green image data, and blue image data. The input control signal CONT may include a master clock signal, data enable, etc. The input control signal CONT may further include a vertical synchronization signal and a horizontal synchronization signal.

The driving controller 200 may generate a first control signal CONT1, a second control signal CONT2, a third control signal CONT3, and an output image data OIMG based on the input image data IMG and the input control signal CONT.

The driving controller 200 may generate the first control signal CONT1 for controlling the operation of the gate driver 300 based on the input control signal CONT. In addition, the driving controller 200 may output the first control signal CONT1 to the gate driver 300. The first control signal CONT1 may include a vertical start signal and a gate clock signal.

The driving controller 200 may generate the second control signal CONT2 for controlling the operation of the data driver 400 based on the input control signal CONT. In addition, the driving controller 200 may output the second control signal CONT2 to the data driver 400. The second control signal CONT2 may include a horizontal start signal and a load signal.

The driving controller 200 may generate the third control signal CONT3 for controlling the operation of the light emitting driver 500 based on the input control signal CONT. In addition, the driving controller 200 may output the third control signal CONT3 to the light emitting driver 500. The third control signal CONT3 may include a vertical start signal and a light emitting clock signal.

The driving controller 200 may generate the output image data OIMG by receiving or based on the input image data IMG and the input control signal CONT. The driving controller 200 may output the output image data OIMG to the data driver 400.

The gate driver 300 may generate gate signals for driving the gate lines GWL, GIL, and GCL in response to the first control signal CONT1 received from the driving controller 200. The gate signals may include a write gate signal (e.g., a write gate signal GW of FIG. 3), an initialization gate signal (e.g., an initialization gate signal GI of FIG. 3), a compensation gate signal (e.g., a compensation gate signal GC of FIG. 3) and a bias gate signal (e.g., a bias gate signal GB of FIG. 3).

The gate lines GWL, GIL, and GCL may include write gate lines GWL, initialization gate lines GIL, and compensation gate lines GCL. In an embodiment, for example, the gate driver 300 may output the write gate signal to the write gate lines GWL. The gate driver 300 may output the initialization gate signal to the initialization gate lines GIL. The gate driver 300 may output the compensation gate signal to the compensation gate lines GCL. The gate driver 300 may output the bias gate signal to the write gate lines GWL.

The data driver 400 may receive the second control signal CONT2 and the output image data OIMG from the driving controller 200. The data driver 400 may generate a data voltage (e.g., a data voltage VDATA of FIG. 3) by converting the output image data OIMG into an analog form of voltage. The data driver 400 may output the data voltage to the data lines DL.

The light emitting driver 500 may receive the third control signal CONT3 from the driving controller 200. The light emitting driver 500 may generate a light emitting control signal (e.g., a light emitting control signal EM of FIG. 3) for driving the light emitting control lines EML. The light emitting driver 500 may output the light emitting control signal to the light emitting control lines EML.

FIG. 2 illustrates an embodiment where the gate driver 300 is disposed on a first side of the display part 110 and the light emitting driver 500 is disposed on a second side of the display part 110 for convenience of description, but the disclosure is not limited thereto. In an alternative embodiment, for example, both the gate driver 300 and the light emitting driver 500 may be disposed on the first side of the display part 110. In an alternative embodiment, for example, the gate driver 300 and the light emitting driver 500 may be integrally formed as a single chip.

Figure 3:
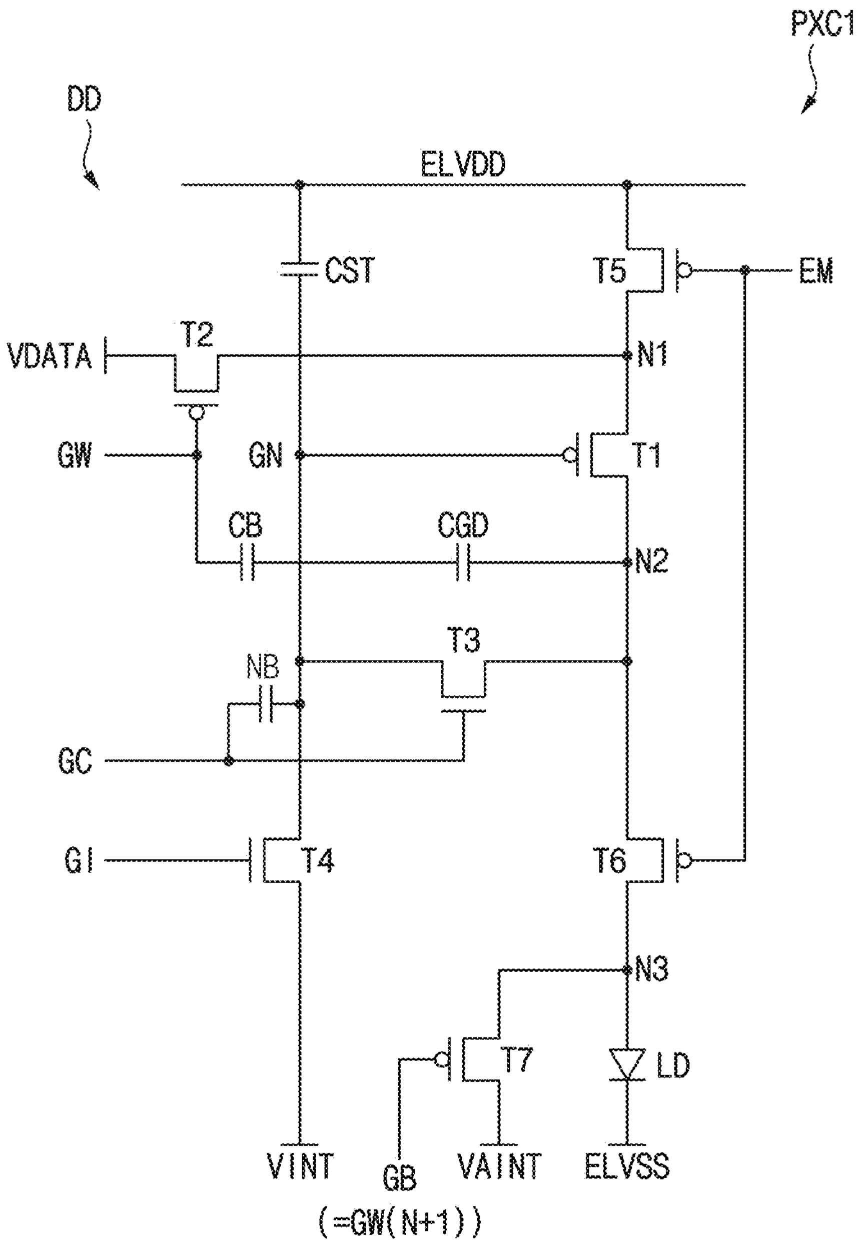
FIG. 3 is a circuit diagram illustrating a pixel included in the display device of FIG. 1 according to an embodiment.

FIG. 3 is a circuit diagram illustrating a pixel included in the display device of FIG. 1 according to an embodiment.

Referring to FIG. 3, in an embodiment, each pixel PX may include a first pixel circuit PXC1. In such an embodiment the first pixel circuit PXC1 may include a light emitting element LD, a first transistor T1, a second transistor T2, a third transistor T3, a fourth transistor T4, a fifth transistor T5, a sixth transistor T6, a seventh transistor T7, a storage capacitor CST, a boost capacitor CB, a negative boost capacitor NB, and a gate-drain capacitor CGD. However, the disclosure is not limited thereto. Alternatively, some of the components of the first pixel circuit PXC1 may be omitted and other components may be added. In an embodiment, for example, the first pixel circuit PXC1 may further include a second storage capacitor including a first electrode to which a driving voltage ELVDD is applied and a second electrode connected to a first electrode of the first transistor T1.

The first transistor T1 may include a gate electrode, a first electrode, and a second electrode. The gate electrode of the first transistor T1 may be connected to a gate node GN. The first electrode of the first transistor T1 may be connected to a first node N1. The second electrode of the first transistor T1 may be connected to a second node N2. The first transistor T1 may generate a driving current based on a voltage difference between the gate electrode and the first electrode. In such an embodiment, the first transistor T1 may be referred to as a driving transistor.

The second transistor T2 may include a gate electrode, a first electrode, and a second electrode. The gate electrode of the second transistor T2 may receive a write gate signal GW. The second transistor T2 may be turned on or off in response to the write gate signal GW. The first electrode of the second transistor T2 may receive a data voltage VDATA. The second electrode of the second transistor T2 may be connected to the first node N1. While the second transistor T2 is turned on, the second transistor T2 may provide the data voltage VDATA to the first electrode of the first transistor T1. In such an embodiment, the second transistor T2 may be referred to as a writing transistor.

The third transistor T3 may include a gate electrode, a first electrode, and a second electrode. The third transistor T3 may be connected between the gate electrode of the first transistor T1 and the second electrode of the first transistor T1. In such an embodiment, the first electrode of the third transistor T3 may be connected to the gate node GN, and the second electrode of the third transistor T3 may be connected to the second node N2. The gate electrode of the third transistor T3 may receive a compensation gate signal GC. The third transistor T3 may be turned on or off in response to the compensation gate signal GC. While the third transistor T3 is turned on, the third transistor T3 may diode-connect the first transistor T1. In other words, the third transistor T3 may compensate for the threshold voltage of the first transistor T1. In such an embodiment, the third transistor T3 may be referred to as a compensation transistor.

In an embodiment, as illustrated in FIG. 3, the third transistor T3 may have a single transistor structure. Alternatively, the third transistor T3 may have a dual transistor structure in which two transistors are connected to each other in series.

The fourth transistor T4 may include a gate electrode, a first electrode, and a second electrode. The gate electrode of the fourth transistor T4 may receive an initialization gate signal GI. The fourth transistor T4 may be turned on or off in response to the initialization gate signal GI. The first electrode of the fourth transistor T4 may receive a gate initialization voltage VINT. The second electrode of the fourth transistor T4 may be connected to the gate node GN. While the fourth transistor T4 is turned on, the fourth transistor T4 may provide the gate initialization voltage VINT to the gate electrode of the first transistor T1. In such an embodiment, the fourth transistor T4 may be referred to as a gate initialization transistor.

In an embodiment, as illustrated in FIG. 3, the fourth transistor T4 may have a single transistor structure. Alternatively, the fourth transistor T4 may have a dual transistor structure in which two transistors are connected to each other in series.

The fifth transistor T5 may include a gate electrode, a first electrode, and a second electrode. The gate electrode of the fifth transistor T5 may receive a light emitting control signal EM. The fifth transistor T5 may be turned on or off in response to the light emitting control signal EM. The first electrode of the fifth transistor T5 may receive a driving voltage ELVDD. The second electrode of the fifth transistor T5 may be connected to the first node N1. While the fifth transistor T5 is turned on, the fifth transistor T5 may provide the driving voltage ELVDD to the first electrode of the first transistor T1. In such an embodiment, the fifth transistor T5 may be referred to as a first light emitting control transistor.

The sixth transistor T6 may include a gate electrode, a first electrode, and a second electrode. The gate electrode of the sixth transistor T6 may receive the light emitting control signal EM. The sixth transistor T6 may be turned on or off in response to the light emitting control signal EM. The first electrode of the sixth transistor T6 may be connected to the second node N2. The second electrode of the sixth transistor T6 may be connected to a third node N3. While the sixth transistor T6 is turned on, the sixth transistor T6 may provide the driving current generated by the first transistor T1 to the light emitting element LD. In such an embodiment, the sixth transistor T6 may be referred to as a second light emitting control transistor.

The seventh transistor T7 may include a gate electrode, a first electrode, and a second electrode. The gate electrode of the seventh transistor T7 may receive a bias gate signal GB. In an embodiment, the bias gate signal GB may be a next write gate signal GW(N+1). The next write gate signal GW(N+1) may be defined as a write gate signal of the next stage (e.g., a write gate signal of (N+1)-th stage) of the write gate signal GW (e.g., a write gate signal of N-th stage). That is, the seventh transistor T7 may be turned on or off in response to the next write gate signal GW(N+1). The first electrode of the seventh transistor T7 may receive an anode initialization voltage VAINT. The second electrode of the seventh transistor T7 may be connected to the third node N3. While the seventh transistor T7 is turned on, the seventh transistor T7 may provide the anode initialization voltage VAINT to an anode electrode of the light emitting element LD. In such an embodiment, the seventh transistor T7 may be referred to as an anode initialization transistor.

In an embodiment, each of the first transistor T1, the second transistor T2, the fifth transistor T5, the sixth transistor T6, and the seventh transistor T7 may be a P-channel metal oxide semiconductor ("PMOS") transistor, and each of the third transistor T3 and the fourth transistor T4 may be an N-channel metal oxide semiconductor ("NMOS") transistor. Accordingly, an active pattern of each of the first transistor T1, the second transistor T2, the fifth transistor T5, the sixth transistor T6, and the seventh transistor T7 may include a silicon semiconductor doped with cations. In addition, an active pattern of each of the third transistor T3 and the fourth transistor T4 may include an oxide semiconductor.

In addition, each of the write gate signal GW for turning on the second transistor T2, the light emitting control signal EM for turning on the fifth transistor T5 and the sixth transistor T6, and the bias gate signal GB for turning on the seventh transistor T7 may have a low level, that is, a turn-on voltage thereof may be a low voltage. Each of the compensation gate signal GC for turning on the third transistor T3 and the initialization gate signal GI for turning on the fourth transistor T4 may have a high level, that is, a turn-off voltages thereof may be a high voltage.

The storage capacitor CST may include a first electrode and a second electrode. The first electrode of the storage capacitor CST may receive the driving voltage ELVDD. The second electrode of the storage capacitor CST may be connected to the gate node GN. The storage capacitor CST may maintain the voltage level of the gate electrode of the first transistor T1 when the second transistor T2 is turned off.

The boost capacitor CB may include a first electrode and a second electrode. The first electrode of the boost capacitor CB may receive the write gate signal GW. The second electrode of the boost capacitor CB may be connected to the gate node GN. The boost capacitor CB may change a voltage of the gate node GN when the write gate signal GW is changed. In an embodiment, for example, when the write gate signal GW changes from a low level to a high level, the boost capacitor CB may increase the voltage of the gate node GN.

The negative boost capacitor NB may include a first electrode and a second electrode. The first electrode of the negative boost capacitor NB may receive the compensation gate signal GC. The second electrode of the negative boost capacitor NB may be connected to the gate node GN. The negative boost capacitor NB may change the voltage of the gate node GN when the compensation gate signal GC is changed. In an embodiment, for example, when the compensation gate signal GC changes from a high level to a low level, the negative boost capacitor NB may decrease the voltage of the gate node GN.

The light emitting element LD may include the anode electrode and a cathode electrode. The anode electrode of the light emitting element LD may be connected to the third node N3. The cathode electrode of the light emitting element LD may receive a common voltage ELVSS. The light emitting element LD may generate light having a luminance corresponding to the driving current.

The gate-drain capacitor CGD may include a first electrode and a second electrode. The gate-drain capacitor CGD may be connected between the gate electrode of the first transistor T1 and the second electrode of the first transistor T1. In an embodiment, the first electrode of the gate-drain capacitor CGD may be connected to the gate node GN, and the second electrode of the gate-drain capacitor CGD may be connected to the second node N2. In such an embodiment, the gate-drain capacitor CGD may be connected in parallel with the third transistor T3.

Figure 4:
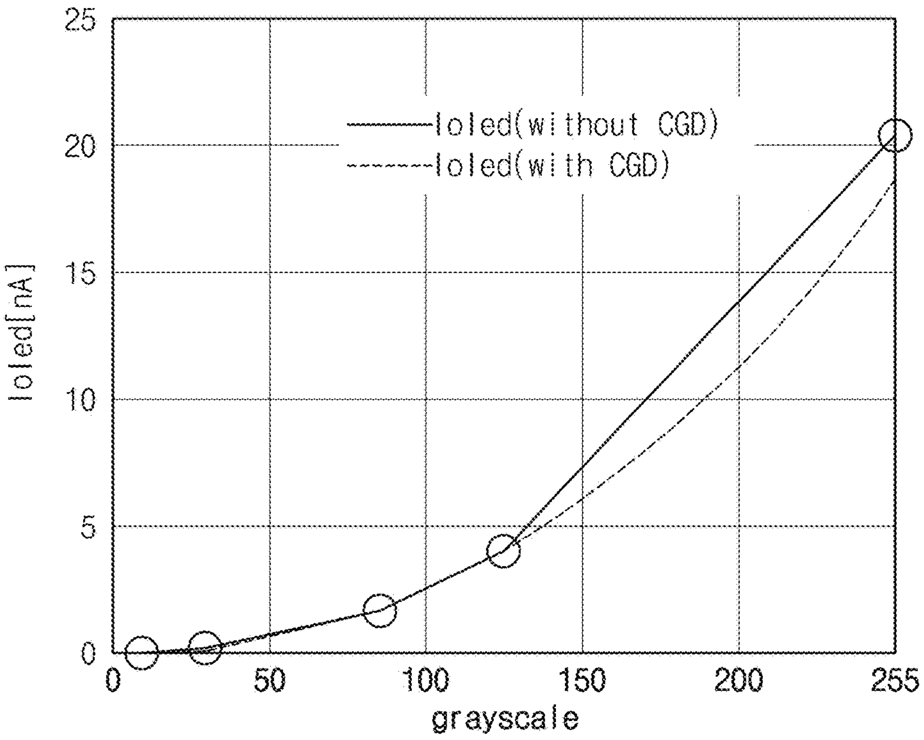
FIG. 4 is a diagram showing a relationship between a grayscale and a current.
Figure 5:
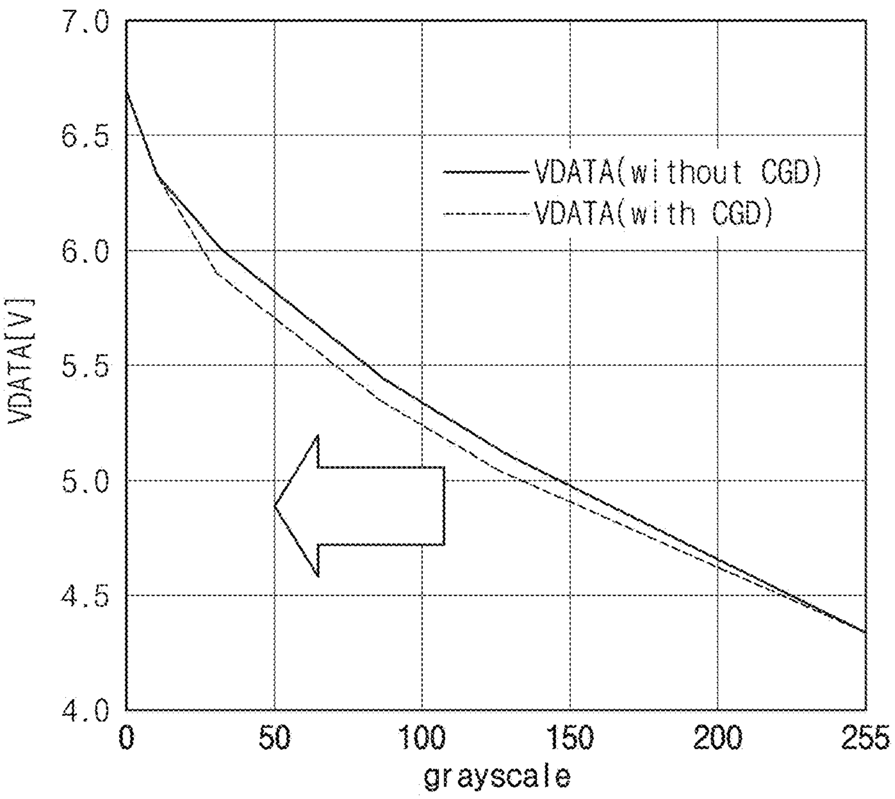
FIG. 5 is a diagram showing a relationship between a grayscale and a voltage.
Figure 6:
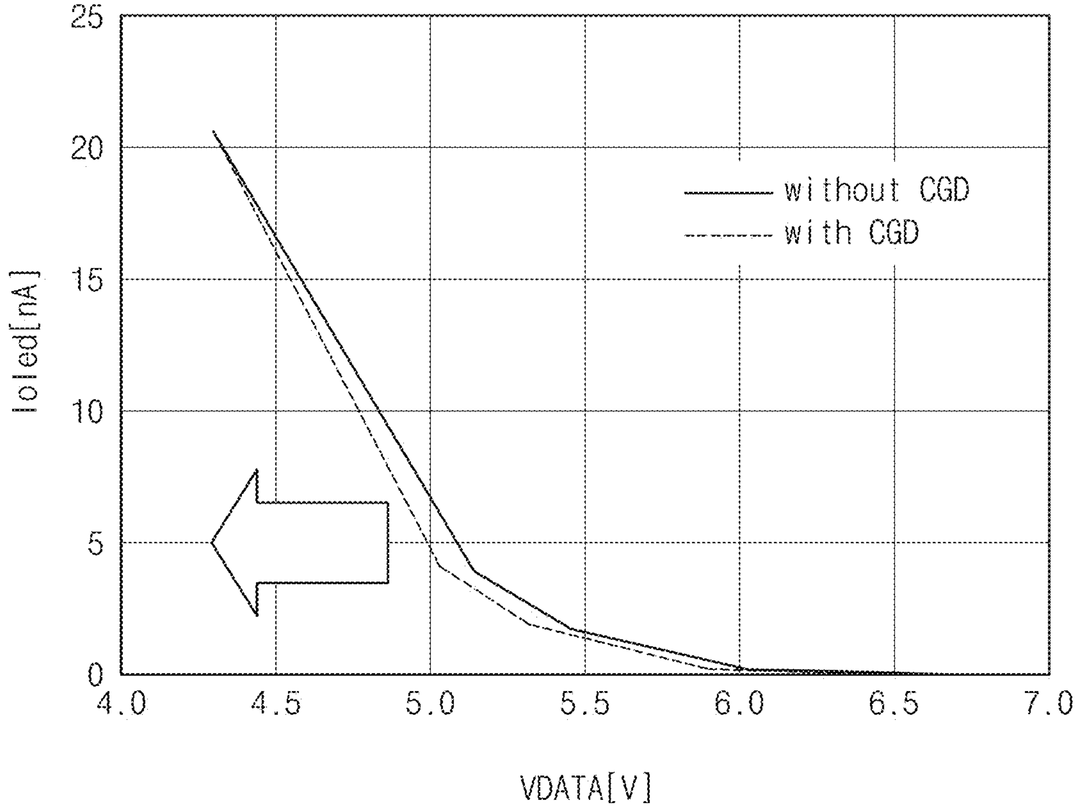
FIG. 6 is a diagram showing a relationship between a voltage and a current.
Figure 7:
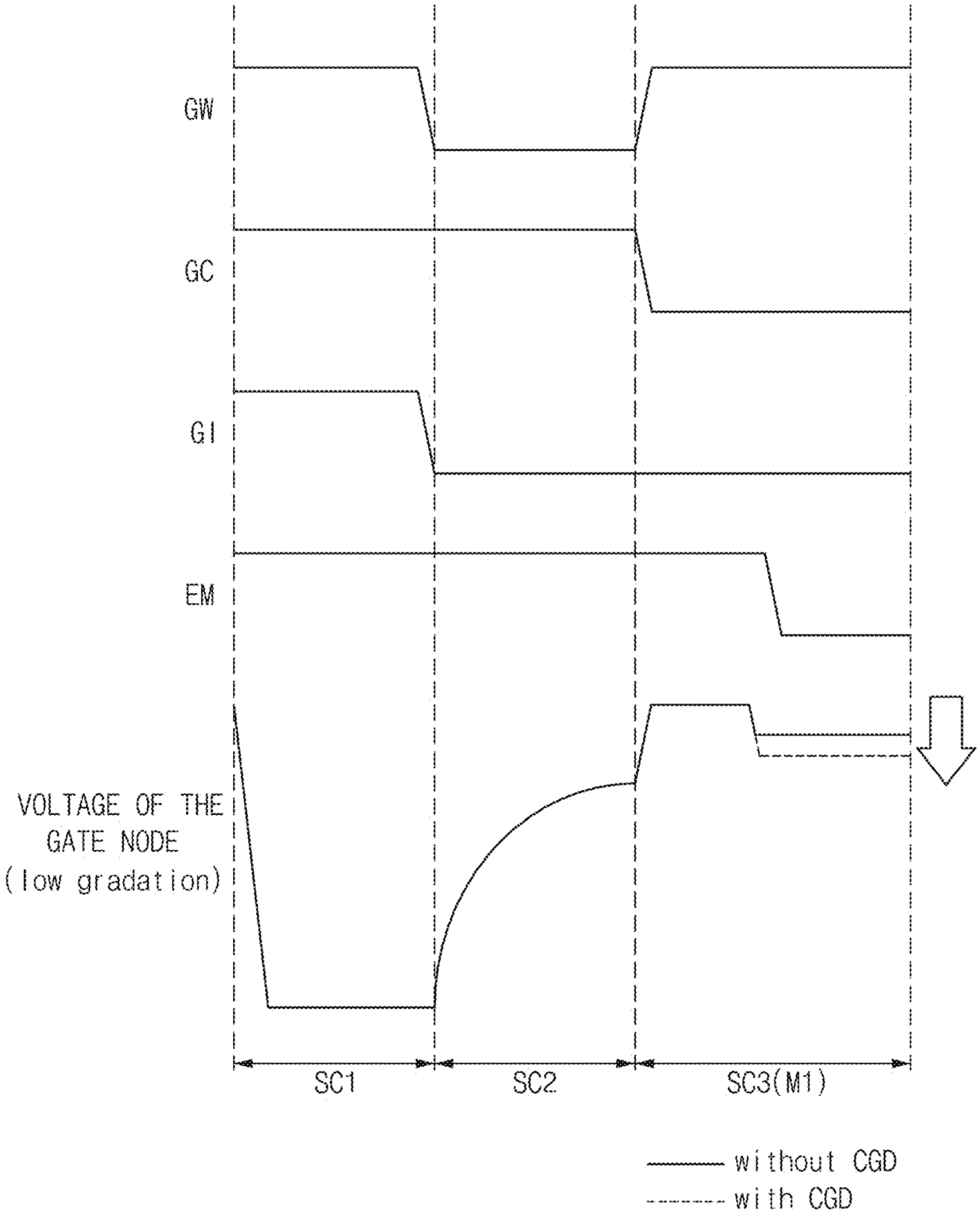
FIGS. 7 and 8 are diagrams showing a voltage change of a gate node of FIG. 3.
Figure 8:
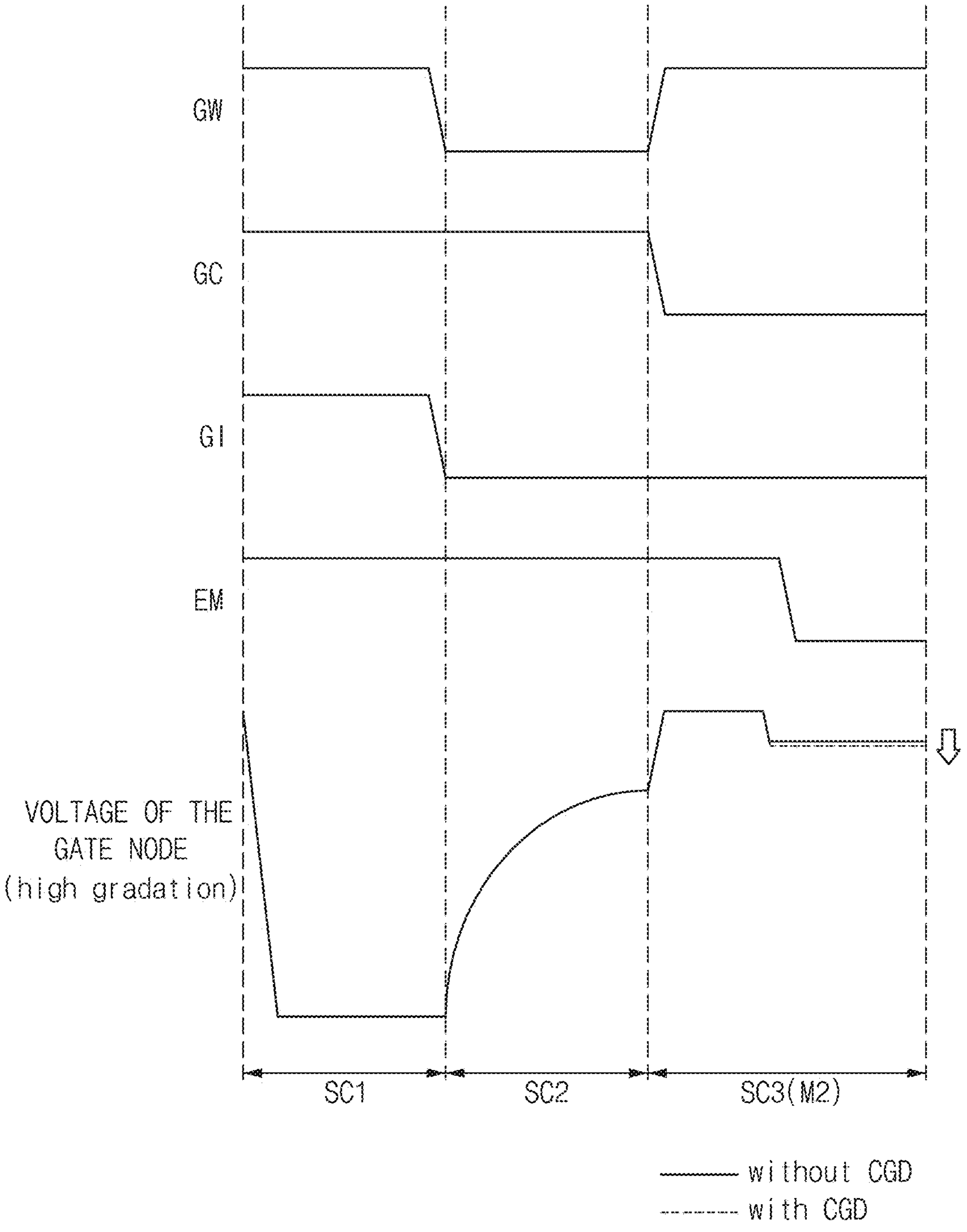

FIG. 4 is a diagram showing a relationship between a grayscale and a current. FIG. 5 is a diagram showing a relationship between a grayscale and a voltage. FIG. 6 is a diagram showing a relationship between a voltage and a current. FIGS. 7 and 8 are diagrams showing a voltage change of a gate node of FIG. 3. Particularly, FIG. 7 is a diagram showing the voltage change of the gate node GN at a low gradation, and FIG. 8 is a diagram showing the voltage change of the gate node GN at a high gradation.

Referring to FIGS. 3 and 4, a change amount of a current Ioled according to a change in a grayscale at a low gradation may be relatively small. For example, as shown in FIG. 4, when the grayscale of light emitted from the light emitting element LD is divided into grayscales of 0 to 255, a difference between the level of the driving current Ioled provided to the light emitting element LD to emit light having a grayscale of 0 and the level of the driving current Ioled provided to the light emitting element LD to emit light having a grayscale of 25 may be relatively small.

In contrast, a change amount of the current Ioled according to a change in the grayscale at a high gradation may be relatively large. For example, as shown in FIG. 4, a difference between the level of the driving current Ioled provided to the light emitting element LD to emit light having a grayscale of 255 and the level of the driving current Ioled provided to the light emitting element LD to emit light having a grayscale of 230 may be relatively large.

That is, at the low gradation period, even if a relatively small error occurs in the level of the driving current Ioled provided to the light emitting element LD, a problem in which a gradation of light emitted from the light emitting element LD rapidly changes (i.e., a problem in which stains occur at the low gradation period) may occur.

Referring further to FIG. 5, in an embodiment, it may be desired to increase the change amount in the voltage VDATA according to the change in the grayscale at the low gradation period to prevent the gradation of light emitted from the light emitting element LD from rapidly changing. In an embodiment, it may be desired to increase the change amount in the voltage VDATA according to the change in the grayscale at the low gradation period, and to decrease the change amount in the voltage VDATA according to the change in the grayscale at the high gradation period.

Referring further to FIG. 6, at a low gradation period (e.g., an interval in which the voltage VDATA has a value of more than about 5.0 volts (V) and less than about 6.8 V), as the change amount in the voltage VDATA according to the change in the grayscale increases, the level variation of the driving current Ioled provided to the light emitting element LD to emit light having a specific grayscale may be reduced. In other words, if the change amount in the voltage according to the change in the grayscale increases at the low gradation period, the gradation of light emitted from the light emitting element LD may not rapidly change.

In an embodiment, the first pixel circuit PXC1 of the disclosure may include the gate-drain capacitor CGD connected between the gate electrode of the first transistor T1 and the second electrode of the first transistor T1.

Referring further to FIGS. 7 and 8, at an initial period SC1, the write gate signal GW, the compensation gate signal GC, the initialization gate signal GI, and the light emitting control signal EM may have a high level. Accordingly, each of the third transistor T3 and the fourth transistor T4 may be turned on, and each of the second transistor T2, the fifth transistor T5, and the sixth transistor T6 may be turned off. As the fourth transistor T4 is turned on, the fourth transistor T4 may provide the gate initialization voltage VINT to the gate node GN. In addition, when the third transistor T3 is turned on, the third transistor T3 may diode-connect the first transistor T1.

At a data writing period SC2, each of the write gate signal GW and the initialization gate signal GI may have a low level, and each of the compensation gate signal GC and the light emitting control signal EM may have a high level. Accordingly, each of the second transistor T2 and the third transistor T3 may be turned on, and each of the fourth transistor T4, the fifth transistor T5, and the sixth transistor T6 may be turned off. When the second transistor T2 is turned on, the second transistor T2 may provide the data voltage VDATA to the first node N1. In addition, when the third transistor T3 is turned on, the third transistor T3 may diode-connect the first transistor T1.

At a frame emission period SC3, each of the write gate signal GW and the emission control signal EM may have a high level, and each of the compensation gate signal GC and initialization gate signal GI may have a low level. Accordingly, each of the second transistor T2, the third transistor T3, and the fourth transistor T4 may be turned off, and each of the fifth transistor T5 and the sixth transistor T6 may be turned on.

In an embodiment, as show in FIGS. 7 and 8, driving the frame emission period SC3 at a first gradation may be defined as a first mode M1, and driving the frame emission period SC3 at a second gradation greater than the first gradation may be defined as a second mode M2.

As illustrated in FIG. 7, in the first mode M1, as each of the fifth transistor T5 and the sixth transistor T6 is turned on, the driving current generated in the first transistor T1 may be provided to the light emitting element LD. Since the luminance of the light emitting element LD is relatively low at the first gradation, the voltage of the second node N2 may be relatively further reduced. In an embodiment, for example, the voltage of the second node N2 may have a value of greater than about 0 V to less than about 1 V. In this case, since the second node N2 and the gate node GN are connected through the gate-drain capacitor CGD, the voltage of the gate node GN may be coupled to the voltage of the second node N2 and relatively further reduced.

As illustrated in FIG. 8, in the second mode M2, as each of the fifth transistor T5 and the sixth transistor T6 is turned on, the driving current generated in the first transistor T1 may be provided to the light emitting element. (LD). Since the luminance of the light emitting element LD is relatively high at the second gradation, the voltage of the second node N2 may be relatively less reduced. In an embodiment, for example, the voltage of the second node N2 may have a value greater than about 3.5 V and less than about 4.0 V. In this case, since the second node N2 and the gate node GN are connected through the gate-drain capacitor CGD, the voltage of the gate node GN may be coupled to the voltage of the second node N2 and relatively less reduced.

In such an embodiment, as the first pixel circuit PXC1 of the disclosure includes the gate-drain capacitor CGD, the change amount in the voltage of the gate node GN may be relatively greater when driving the frame emission period SC3 at the low gradation. As a result, as the change amount in the voltage according to the change in the grayscale at the low gradation increases, the gradation of light emitted from the light emitting element LD may be effectively prevented from rapidly changing.

Figure 9:
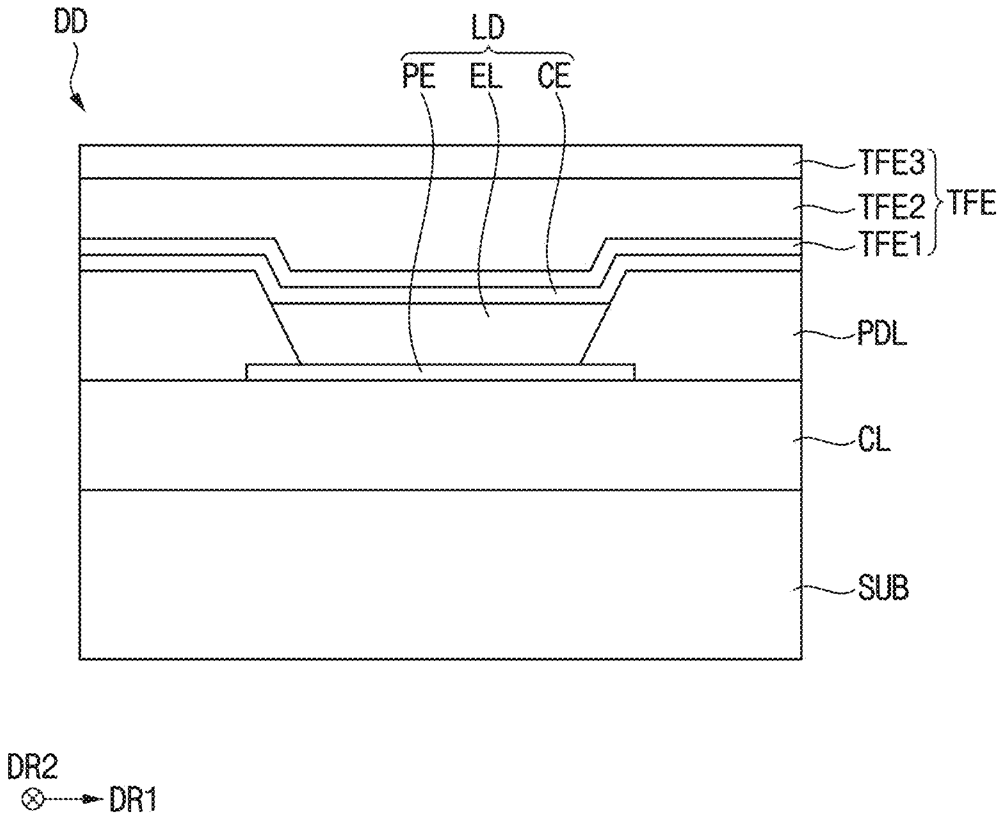
FIG. 9 is a cross-sectional view illustrating the display device of FIG. 1.

FIG. 9 is a cross-sectional view illustrating the display device of FIG. 1. Particularly, FIG. 9 is a cross-sectional view illustrating a cross-section of the pixel PX of FIG. 1 according to an embodiment.

Referring to FIG. 9, the display device DD according to an embodiment of the disclosure may include a substrate SUB, a circuit layer CL, the light emitting element LD, a pixel defining layer PDL, and an encapsulation layer TFE. The light emitting element LD may include an anode electrode PE, a light emitting layer EL, and a cathode electrode CE. The substrate SUB may include a transparent material or an opaque material. The substrate SUB may include or be formed of a transparent resin substrate. Examples of the transparent resin substrate may include a polyimide substrate, etc. In this case, the polyimide substrate may include a first organic layer, a first barrier layer, a second organic layer, or the like. Alternatively, the substrate SUB may include a quartz substrate, a synthetic quartz substrate, a calcium fluoride substrate, a fluorine-doped quartz substrate, a soda-lime glass substrate, a non-alkali glass substrate, or the like. These may be used alone or in combination with each other.

The circuit layer CL may be disposed on the substrate SUB. The circuit layer CL may provide signals and voltages to the light emitting element LD for the light emitting element LD to emit light. In an embodiment, for example, the circuit layer CL may include transistors, a conductive layer, an insulating layer, or the like.

The anode electrode PE may be disposed on the circuit layer CL. The anode electrode PE may receive the signals and the voltages from the circuit layer CL. In an embodiment, for example, the anode electrode PE may include a metal, an alloy, a metal nitride, a conductive metal oxide, a transparent conductive material, or the like. These may be used alone or in combination with each other.

The pixel defining layer PDL may be disposed on the circuit layer CL and the anode electrode PE. An opening exposing at least a portion of an upper surface of the anode electrode PE may be defined in the pixel defining layer PDL.

As the opening is defined in the pixel defining layer PDL, the pixel defining layer PDL may define the pixel (e.g., the pixel PX of FIG. 1) that emit light. The pixel defining layer PDL may include an organic insulating material or an inorganic insulating material. The organic insulating material may include photoresist, polyacryl-based resin, polyimide-based resin, acryl-based resin, or the like. These may be used alone or in combination with each other.

The light emitting layer EL may be disposed on the anode electrode PE. In an embodiment, the light emitting layer EL may be disposed in the opening of the pixel defining layer PDL. The light emitting layer EL may include materials for emitting light. In an embodiment, for example, the light emitting layer EL may include an organic light emitting material and/or an inorganic light emitting material.

The cathode electrode CE may be disposed on the pixel defining layer PDL and the light emitting layer EL. In an embodiment, for example, the cathode electrode CE may include a metal, an alloy, a metal nitride, a conductive metal oxide, a transparent conductive material, or the like. These may be used alone or in combination with each other.

Accordingly, the light emitting element LD including the anode electrode PE, the light emitting layer EL, and the cathode electrode CE may be disposed on the substrate SUB. The encapsulation layer TFE may be disposed on the cathode electrode CE. The encapsulation layer TFE may protect the light emitting element LD from external oxygen and moisture. The encapsulation layer TFE may include at least one inorganic layer and at least one organic layer. In an embodiment, for example, the encapsulation layer TFE may include a first inorganic layer TFE1 disposed on the cathode electrode CE, an organic layer TFE2 disposed on the first inorganic layer TFE1, and a second inorganic layer TFE3 disposed on the organic layer TFE2.

Although an embodiment where the display device DD is the organic light emitting display device ("OLED") is described above, the configuration of the disclosure is not limited thereto. In alternative embodiments, the display device DD may be a liquid crystal display device ("LCD"), a field emission display device ("FED"), a plasma display device ("PDP"), an electrophoretic image display device ("EPD"), an inorganic light emitting display device ("ILED"), or a quantum dot display device.

FIGS. 10, 11, 12, 13, 14, 15, 16, and 17 are plan views showing layers of a pixel included in the display device of FIGS. 1 and 3. Particularly, FIG. 12 may be a plan view illustrating the circuit layer CL of FIG. 9. At least some of the components illustrated in FIGS. 10 to 17 may be connected to each other among a plurality of pixel circuits.

Figure 10:
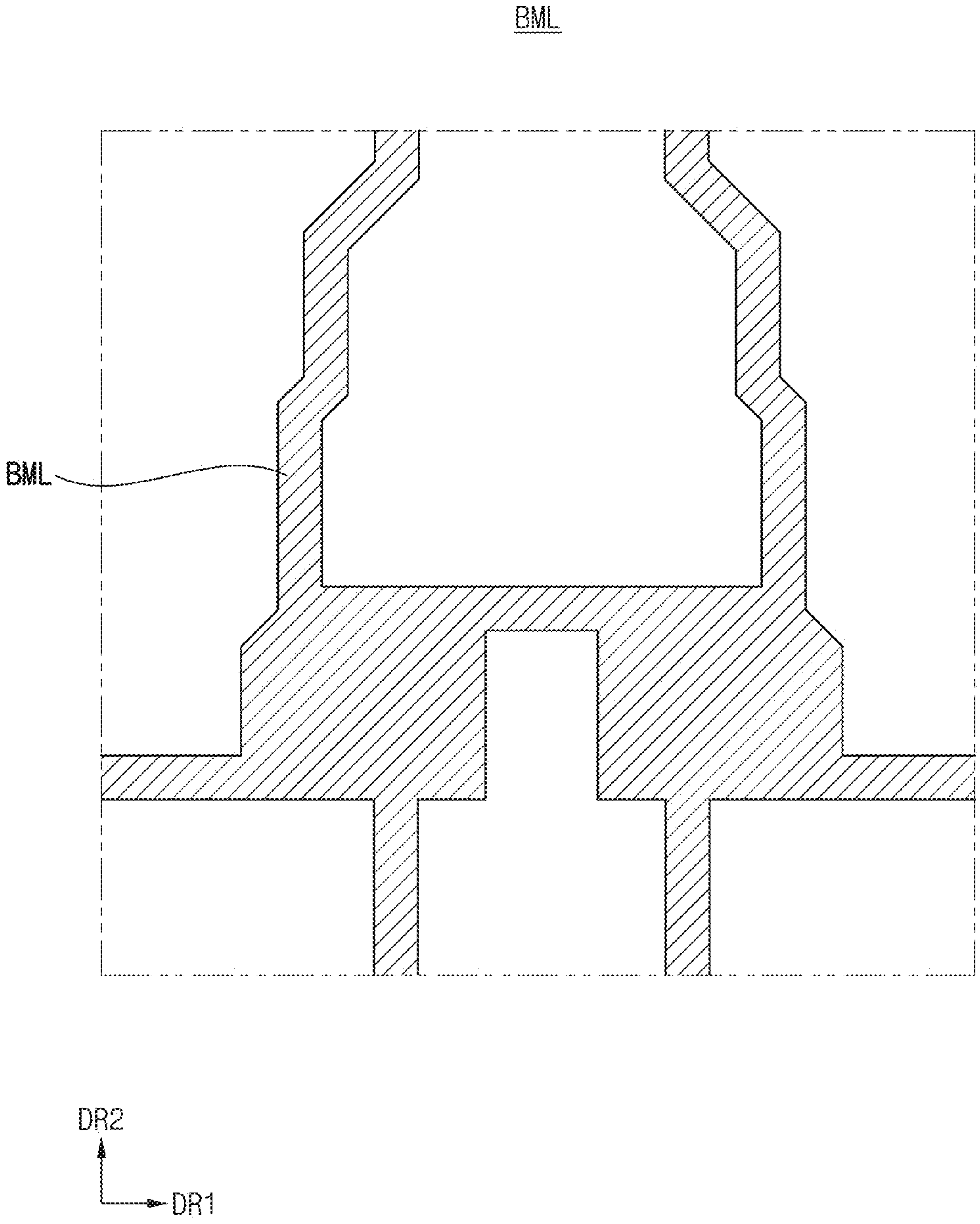
FIGS. 10, 11, 12, 13, 14, 15, 16, and 17 are plan views showing layers of a pixel included in the display device of FIGS. 1 and 3.

Referring to FIG. 10, the display device DD according to an embodiment of the disclosure may include a substrate (e.g., the substrate SUB shown in FIG. 9) and a lower pattern BML disposed on the substrate.

The substrate may include a transparent material or an opaque material. The substrate may include or be formed of a transparent resin substrate. Examples of the transparent resin substrate may include a polyimide substrate, or the like. In this case, the polyimide substrate may include a first organic layer, a first barrier layer, a second organic layer, or the like. Alternatively, the substrate may include a quartz substrate, a synthetic quartz substrate, a calcium fluoride substrate, a fluorine-doped quartz substrate, a soda-lime glass substrate, a non-alkali glass substrate, or the like. These may be used alone or in combination with each other.

The lower pattern BML may be disposed on the substrate. The lower pattern BML may include a metal, an alloy, a metal nitride, a conductive metal oxide, a transparent conductive material, or the like. Examples of the material that may be used as the lower pattern BML may include silver (Ag), an alloy including silver, molybdenum (Mo), an alloy including molybdenum, aluminum (Al), an alloy including aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

Figure 11:
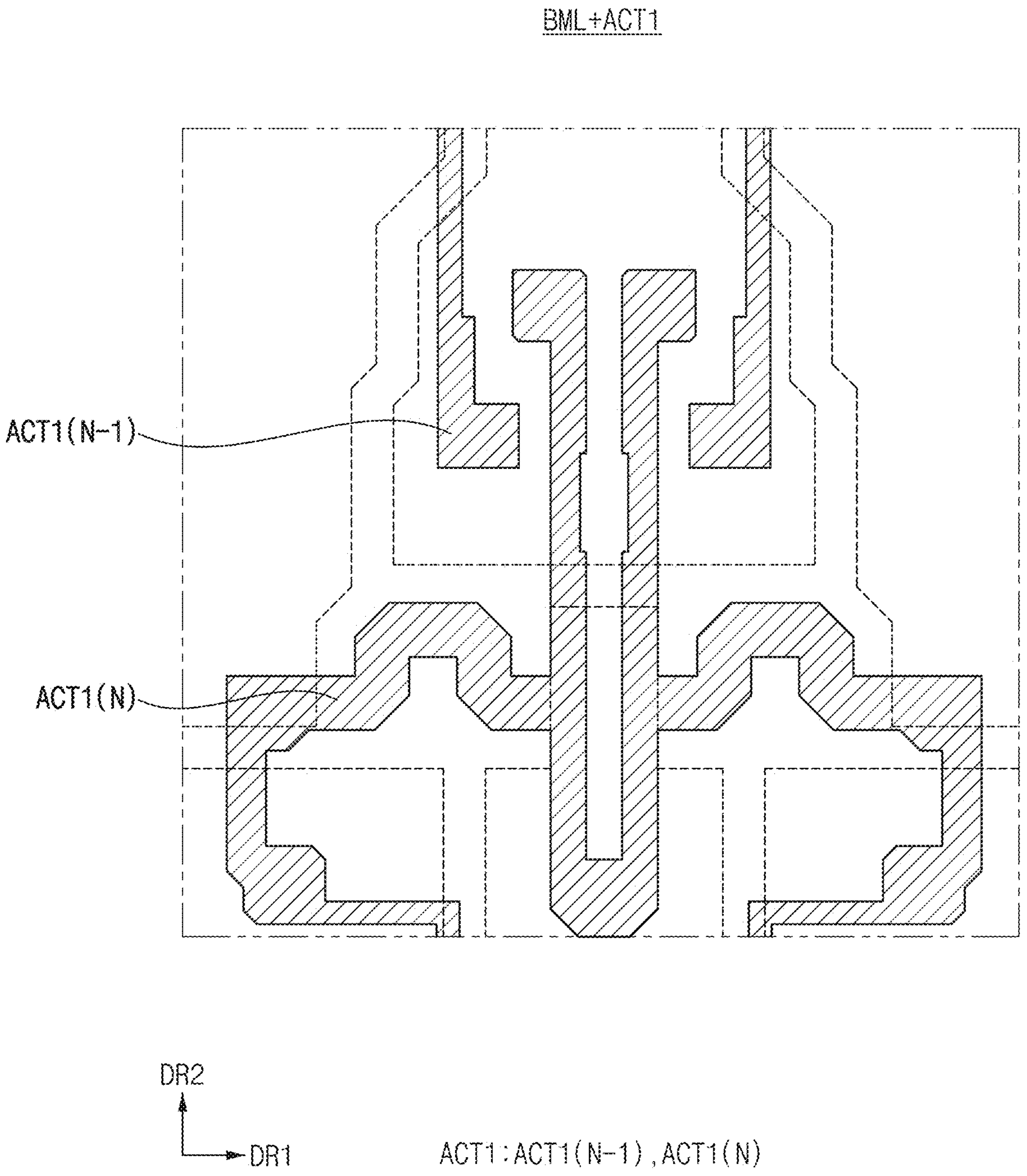

Referring further to FIG. 11, a buffer layer (not shown) may be disposed on the lower pattern BML and may cover the lower pattern BML.

The buffer layer may prevent metal atoms or impurities from diffusing into a first active pattern ACT1. In addition, the buffer layer may control a heat supply rate during a crystallization process for forming the first active pattern ACT1. The buffer layer may include an inorganic insulating material. Examples of the inorganic insulating material that may be used as the buffer layer may include silicon oxide, silicon nitride, silicon oxynitride, or the like. These may be used alone or in combination with each other.

The first active pattern ACT1 may be disposed on the buffer layer. At least a part of the first active pattern ACT1 may overlap the lower pattern BML on a plane.

The first active pattern ACT1 may include a first active pattern of a (N−1)-th row ACT1(N−1), a first active pattern of a N-th row ACT1(N), etc. The first active pattern of the (N−1)-th row ACT1(N−1) may be spaced apart from the first active pattern of the N-th row ACT1(N). Although not illustrated in FIG. 11, a portion having substantially the same shape as the first active pattern of the N-th row ACT1(N) may be adjacent to the first active pattern of the (N−1)-th row ACT1(N−1) in the second direction DR2. Similarly, a portion having substantially the same shape as the first active pattern of the (N−1)-th row ACT1(N−1) may be adjacent to the first active pattern of the N-th row ACT1(N) in the second direction DR2.

In an embodiment, the first active pattern ACT1 may include a silicon semiconductor material. Examples of the silicon semiconductor material that may be used as the first active pattern ACT1 may include amorphous silicon or polycrystalline silicon. The first active pattern ACT1 may include a source area, a drain area, and a channel area positioned between the source area and the drain area.

Figure 12:
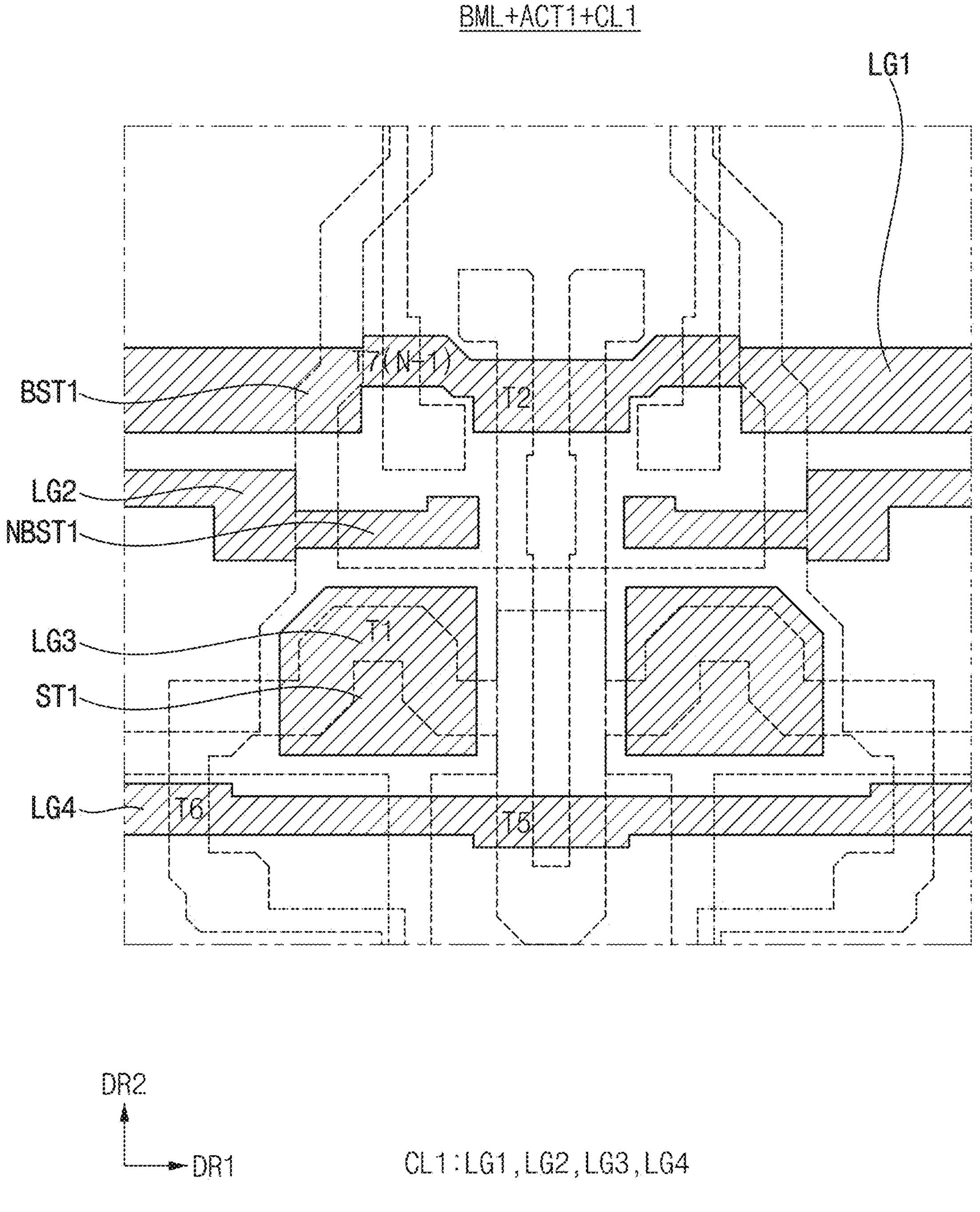

Referring further to FIG. 12, a first gate insulating layer (not shown) may be disposed on the first active pattern ACT1 and may cover the first active pattern ACT1.

The first gate insulating layer may include an inorganic insulating material. Examples of the inorganic insulating material that may be used as the first gate insulating layer may include silicon oxide, silicon nitride, silicon oxynitride, or the like. These may be used alone or in combination with each other.

A first conductive layer CL1 may be disposed on the first gate insulating layer. The first conductive layer CL1 may include a first lower gate pattern LG1, a second lower gate pattern LG2, a third lower gate pattern LG3, and a fourth lower gate pattern LG4. The first to fourth lower gate patterns LG1, LG2, LG3, and LG4 may be disposed in (or directly on) a same layer as each other and may include a same material as each other. The first conductive layer CL1 may include a metal, an alloy, a metal nitride, a conductive metal oxide, a transparent conductive material, or the like. These may be used alone or in combination with each other.

The first conductive layer CL1 may at least partially overlap the first active pattern ACT1. An overlapping part between the first conductive layer CL1 and the first active pattern ACT1 may constitute or collectively define (e.g., constitute) a part of a transistor.

The first lower gate pattern LG1 may extend in the first direction DR1. A part of the first active pattern of the (N−1)-th row ACT1(N−1) and a part of the first lower gate pattern LG1 overlapping the first active pattern of the (N−1)-th row ACT1(N−1) may constitute or collectively define the seventh transistor of the (N−1)-th row T7(N−1). A part of the first active pattern of the N-th row ACT1(N) and a part of the first lower gate pattern LG1 overlapping the first active pattern of the N-th row ACT1(N) may constitute or collectively define the second transistor T2. In an embodiment, for example, the first lower gate pattern LG1 may correspond to each of the gate electrode of the second transistor T2 and the gate electrode of the seventh transistor of the (N−1)-th row T7(N−1). The write gate signal (e.g., the write gate signal GW of FIG. 3) may be provided to the first lower gate pattern LG1. In an embodiment, the first lower gate pattern LG1 may include a first boost electrode BST1.

The second lower gate pattern LG2 may be spaced apart from the first lower gate pattern LG1 in the second direction DR2. The second lower gate pattern LG2 may constitute or collectively define the third transistor (e.g., the third transistor T3 of FIG. 3). The compensation gate signal (e.g., the compensation gate signal GC of FIG. 3) may be provided to the second lower gate pattern LG2. This will be described later with reference to FIG. 14. In an embodiment, the second lower gate pattern LG2 may include a first negative boost electrode NBST1.

The third lower gate pattern LG3 may be spaced apart from the second lower gate pattern LG2 in the second direction DR2. The third lower gate pattern LG3 may have an island shape on a plane. A part of the first active pattern of the N-th row ACT1(N) and a part of the third lower gate pattern LG3 overlapping the first active pattern of the N-th row ACT1(N) may constitute or collectively define the first transistor T1. In an embodiment, for example, the third lower gate pattern LG3 may correspond to the gate electrode of the first transistor T1. In an embodiment, the third lower gate pattern LG3 may include a first storage electrode ST1.

The fourth lower gate pattern LG4 may extend in the first direction DR1 and may be spaced apart from the third lower gate pattern LG3 in the second direction DR2. A part of the first active pattern of the N-th row ACT1(N) and a part of the fourth lower gate pattern LG4 overlapping the first active pattern of the N-th row ACT1(N) may constitute or collectively define the fifth transistor T5 and the sixth transistor T6. In an embodiment, for example, the fourth lower gate pattern LG4 may correspond to each of the gate electrode of the fifth transistor T5 and the gate electrode of the sixth transistor T6. The light emitting control signal (e.g., the light emitting control signal EM of FIG. 3) may be provided to the fourth lower gate pattern LG4.

Although not illustrated in FIG. 12, a portion having substantially the same shape as the first active pattern of the (N−1)-th row ACT1(N−1) may be adjacent to the first active pattern of the N-th row ACT1(N) in the second direction DR2. The portion having substantially the same shape as the first active pattern of the (N−1)-th row ACT1(N−1) and a portion of a first lower gate pattern of a (N+1)-row overlapping the portion may constitute or collectively define a sixth transistor of the N-th row.

Figure 13:
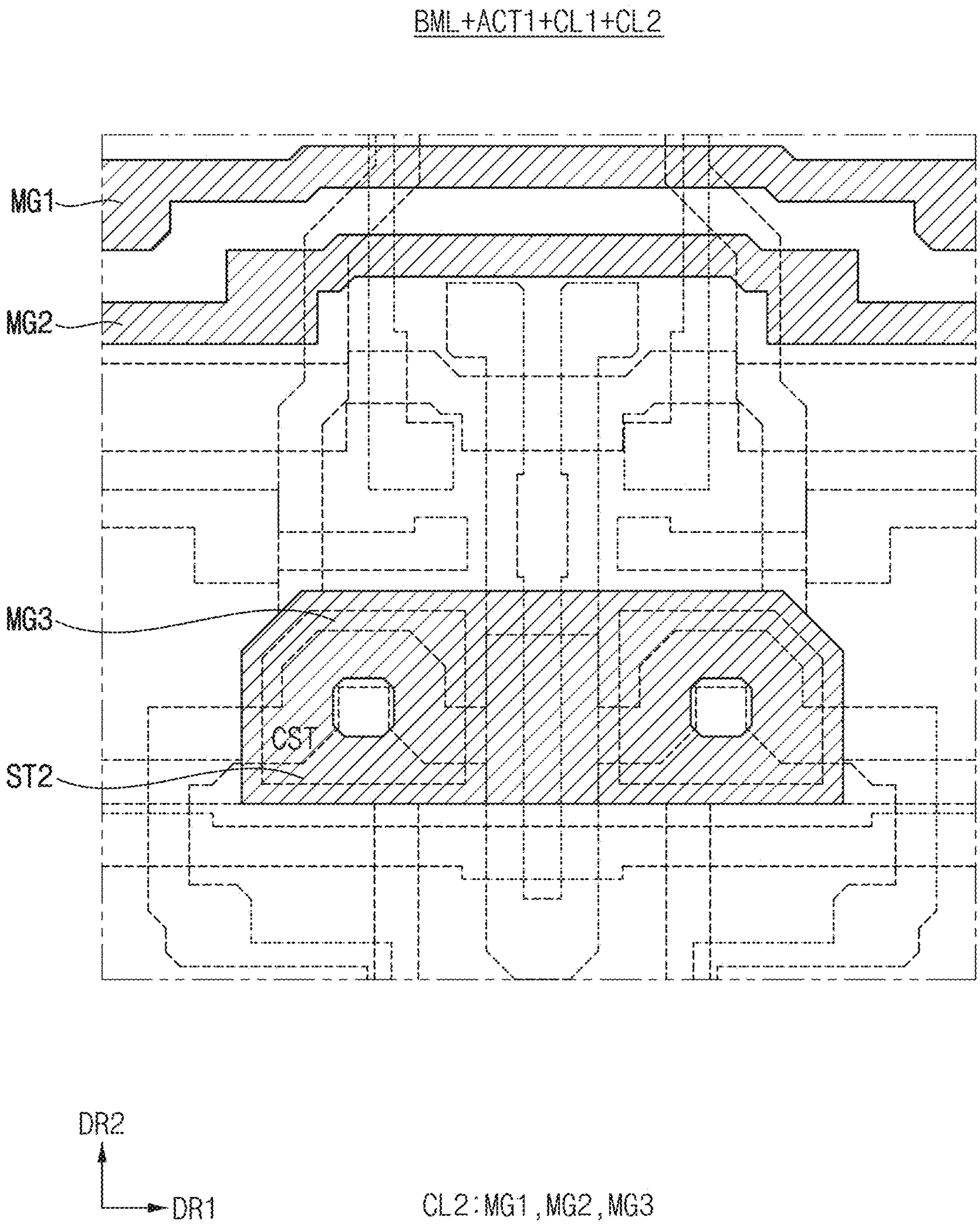

Referring further to FIG. 13, a second gate insulating layer may be disposed on the first conductive layer CL1 and may cover the first conductive layer CL1.

The second gate insulating layer may include an inorganic insulating material. Examples of the inorganic insulating material that may be used as the second gate insulating layer may include silicon oxide, silicon nitride, silicon oxynitride, or the like. These may be used alone or in combination with each other.

A second conductive layer CL2 may be disposed on the second gate insulating layer. The second conductive layer CL2 may include a first intermediate gate pattern MG1, a second intermediate gate pattern MG2, and a third intermediate gate pattern MG3. The first to third intermediate gate patterns MG1, MG2, and MG3 may be disposed in (or directly on) a same layer as each other and may include a same material as each other. The second conductive layer CL2 may include a metal, an alloy, a metal nitride, a conductive metal oxide, a transparent conductive material, or the like. These may be used alone or in combination with each other.

The first intermediate gate pattern MG1 may extend in the first direction DR1. The gate initialization voltage (e.g., the gate initialization voltage VINT of FIG. 3) may be provided to the first intermediate gate pattern MG1. The first intermediate gate pattern MG1 may be referred to as a gate initialization voltage line.

The second intermediate gate pattern MG2 may extend in the first direction DR1 and may be spaced apart from the first intermediate gate pattern MG1 in the second direction DR2. The second intermediate gate pattern MG2 may constitute or collectively define the fourth transistor (e.g., the fourth transistor T4 of FIG. 3). The initialization gate signal (e.g., the initialization gate signal GI of FIG. 3) may be provided to the second intermediate gate pattern MG2. This will be described later with reference to FIG. 14.

The third intermediate gate pattern MG3 may be spaced apart from the second intermediate gate pattern MG2 in the second direction DR2. The third intermediate gate pattern MG3 may include a second storage electrode ST2. The third intermediate gate pattern MG3 may overlap the third lower gate pattern LG3 on a plane. In an embodiment, the second storage electrode ST2 may overlap the first storage electrode ST1. In such an embodiment, in an area where the third intermediate gate pattern MG3 and the third lower gate pattern LG3 overlap, the first storage electrode ST1 and the second storage electrode ST2 may constitute or collectively define the storage capacitor CST. In an embodiment, an opening exposing an upper surface of the third lower gate pattern LG3 may be defined in the third intermediate gate pattern MG3.

Figure 14:
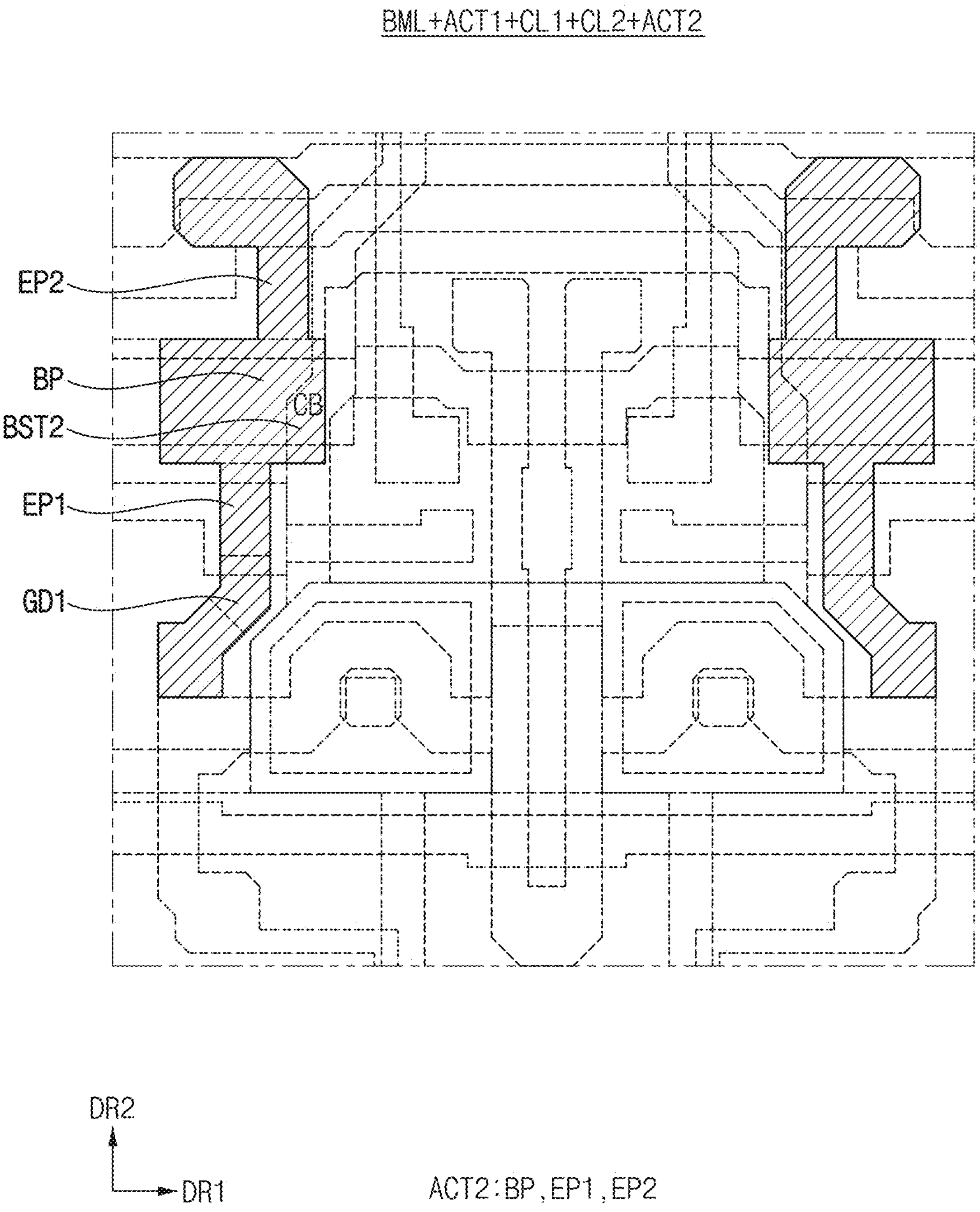

Referring further to FIG. 14, a first inter-layer insulating layer may be disposed on the second conductive layer CL2 and may cover the second conductive layer CL2.

The first inter-layer insulating layer may include an inorganic insulating material. Examples of the inorganic insulating material that may be used as the first inter-layer insulating layer may include silicon oxide, silicon nitride, silicon oxynitride, or the like. These may be used alone or in combination with each other.

A second active pattern ACT2 may be disposed on the first inter-layer insulating layer. At least a portion of the second active pattern ACT2 may overlap each of the second intermediate gate pattern MG2, the first lower gate pattern LG1, and the second lower gate pattern LG2 on a plane.

The second active pattern ACT2 may include a body portion BP, a first extension portion EP1 and a second extension portion EP2. The body portion BP, the first extension portion EP1 and the second extension portion EP2 may be disposed in (or directly on) a same layer as each other and include a same material as each other. In an embodiment, for example, the first extension portion EP1 may be connected to the body portion BP and may be adjacent to the body portion BP in the second direction DR2. The second extension portion EP2 may be connected to the body portion BP and may be adjacent to the body portion BP in the second direction DR2. The first extension portion EP1 and the second extension portion EP2 may be spaced apart from each other.

The body portion BP may include a second boost electrode BST2. The body portion BP may overlap the first lower gate pattern LG1. In an embodiment, the second boost electrode BST2 may overlap the first boost electrode BST1. That is, in an area where the body portion BP and the first lower gate pattern LG1 overlap, the first boost electrode BST1 and the second boost electrode BST2 may constitute or collectively define the boost capacitor CB.

A part of the first extension portion EP1 and a part of the second lower gate pattern LG2 overlapping the first extension portion EP1 may constitute or collectively define the third transistor T3. In an embodiment, for example, the second lower gate pattern LG2 may correspond to a lower gate electrode of the third transistor T3. The compensation gate signal may be provided to the second lower gate pattern LG2. In an embodiment, the first extension portion EP1 may include a first capacitor electrode GD1.

A part of the second extension portion EP2 and a part of the second intermediate gate pattern MG2 overlapping the second extension portion EP2 may constitute or collectively define the fourth transistor T4. In an embodiment, for example, the second intermediate gate pattern MG2 may correspond to a lower gate electrode of the fourth transistor T4. The initialization gate signal may be provided to the second intermediate gate pattern MG2.

In an embodiment, the second active pattern ACT2 may be disposed in (or directly on) a different layer from the first active pattern ACT1 and may not overlap the first active pattern ACT1. In other words, the second active pattern ACT2 may be formed separately from the first active pattern ACT1.

In an embodiment, the first active pattern ACT1 and the second active pattern ACT2 may include different materials, respectively. In an embodiment, for example, the first active pattern ACT1 may include a silicon semiconductor material, and the second active pattern ACT2 may include an oxide semiconductor material. Examples of the oxide semiconductor material that may be used as the second active pattern ACT2 may include indium gallium zinc oxide (IGZO), indium tin zinc oxide (ITZO), or the like. The second active pattern ACT2 may include a source area, a drain area, and a channel area positioned between the source area and the drain area.

Figure 15:
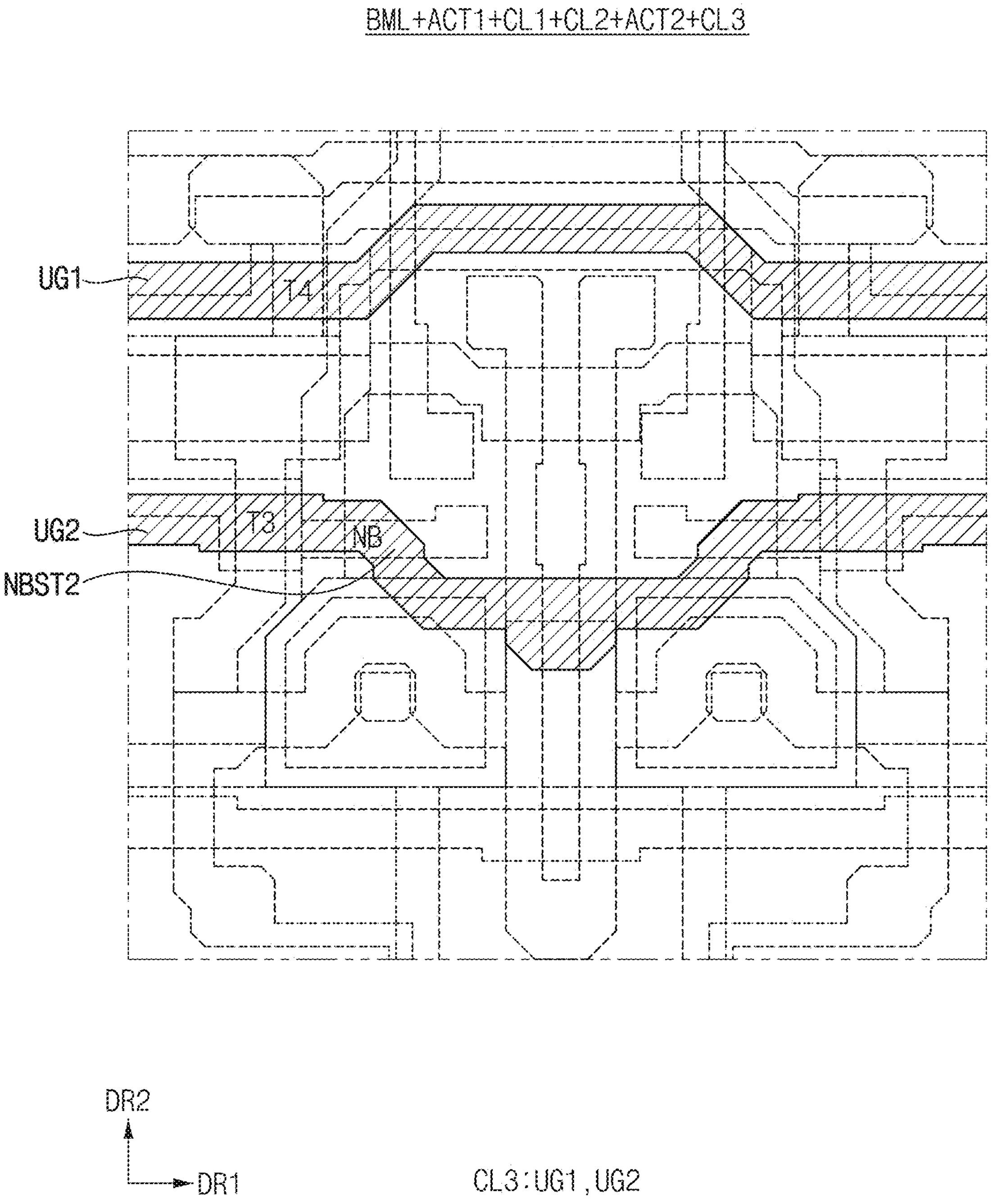

Referring further to FIG. 15, a third gate insulating layer may be disposed on the second active pattern ACT2 and may cover the second active pattern ACT2.

The third gate insulating layer may include an inorganic insulating material. Examples of the inorganic insulating material that may be used as the third gate insulating layer may include silicon oxide, silicon nitride, and silicon oxynitride, or the like. These may be used alone or in combination with each other.

A third conductive layer CL3 may be disposed on the third gate insulating layer. The third conductive layer CL3 may include a first upper gate pattern UG1 and a second upper gate pattern UG2. The first and second upper gate patterns UG1 and UG2 may be disposed in (or directly on) a same layer as each other and may include a same material as each other. The third conductive layer CL3 may include a metal, an alloy, a metal nitride, a conductive metal oxide, a transparent conductive material, or the like. These may be used alone or in combination with each other.

The first upper gate pattern UG1 may extend in the first direction DR1. A part of the second extension portion EP2 and a part of the first upper gate pattern UG1 overlapping the second extension portion EP2 may constitute or collectively define the fourth transistor T4. In an embodiment, for example, the first upper gate pattern UG1 may correspond to an upper gate electrode of the fourth transistor T4. The initialization gate signal may be provided to the first upper gate pattern UG1.

The second upper gate pattern UG2 may extend in the first direction DR1 and may be spaced apart from the first upper gate pattern UG1 in the second direction DR2. A part of the first extension portion EP1 and a part of the second upper gate pattern UG2 overlapping the first extension portion EP1 may constitute or collectively define the third transistor T3. In an embodiment, for example, the second upper gate pattern UG2 may correspond to an upper gate electrode of the third transistor T3. The compensation gate signal may be provided to the second upper gate pattern UG2. The second upper gate pattern UG2 may be referred to as a compensation gate line.

In an embodiment, the second upper gate pattern UG2 may include a second negative boost electrode NBST2. The second upper gate pattern UG2 may overlap the second lower gate pattern LG2. In an embodiment, the second negative boost electrode NBST2 may overlap the first negative boost electrode NBST1. That is, in an area where the second upper gate pattern UG2 and the second lower gate pattern LG2 overlap, the first negative boost electrode NBST1 and the second negative boost electrode NBST2 may constitute or collectively define the negative boost capacitor NB.

Figure 16:
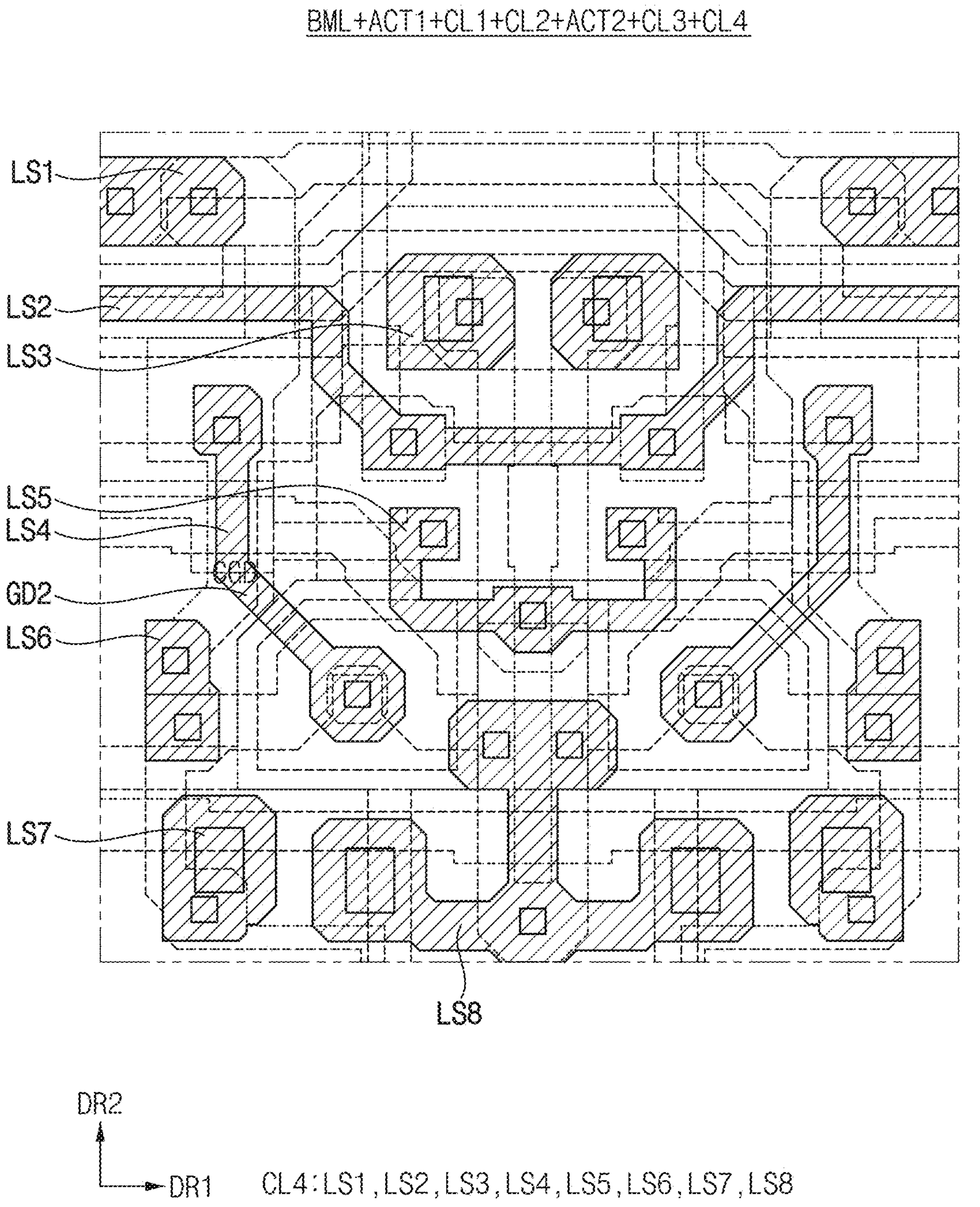

Referring further to FIG. 16, a second inter-layer insulating layer may be disposed on the third conductive layer CL3 and may cover the third conductive layer CL3.

The second inter-layer insulating layer may include an inorganic insulating material. Examples of the inorganic insulating material that may be used as the second interlayer insulating layer may include silicon oxide, silicon nitride, silicon oxynitride, or the like. These may be used alone or in combination with each other.

A fourth conductive layer CL4 may be disposed on the second inter-layer insulating layer. The fourth conductive layer CL4 may include a first lower source pattern LS1, a second lower source pattern LS2, a third lower source pattern LS3, a fourth lower source pattern LS4, a fifth lower source pattern LS5, a sixth lower source pattern LS6, a seventh lower source pattern LS7, and an eighth lower source pattern LS8. The first to eighth lower source patterns LS1, LS2, LS3, LS4, LS5, LS6, LS7, and LS8 may be disposed in (or directly on) a same layer as each other and may include a same material as each other. The fourth conductive layer CL4 may include a metal, an alloy, a metal nitride, a conductive metal oxide, a transparent conductive material, or the like. These may be used alone or in combination with each other.

The gate initialization voltage may be provided to the first lower source pattern LS1. The first lower source pattern LS1 may be connected to each of the second active pattern ACT2 and the first intermediate gate pattern MG1 through contact holes. Accordingly, the gate initialization voltage may be provided to the fourth transistor T4. The first lower source pattern LS1 may be referred to as a gate initialization voltage connection electrode.

The second lower source pattern LS2 may extend in the first direction DR1 and may be spaced apart from the first lower source pattern LS1. The anode initialization voltage (e.g., the anode initialization voltage VAINT of FIG. 3) may be provided to the second lower source pattern LS2. The second lower source pattern LS2 may be connected to the first active pattern of the (N−1)-th row ACT1(N−1) through a contact hole. Accordingly, the anode initialization voltage may be provided to the seventh transistor of the (N−1)-th row T7(N−1). The second lower source pattern LS2 may be referred to as an anode initialization voltage line.

The third lower source pattern LS3 may be spaced apart from the second lower source pattern LS2. The third lower source pattern LS3 may be connected to each of the first active pattern of the N-th row ACT1(N) and a first upper source pattern (e.g., a first upper source pattern US1 of FIG. 17) through contact holes. The data voltage (e.g., the data voltage VDATA of FIG. 3) may be provided to the third lower source pattern LS3. Accordingly, the data voltage may be provided to the second transistor T2. The third lower source pattern LS3 may be referred to as a data voltage connection electrode.

The fourth lower source pattern LS4 may extend in the second direction DR2 and may be spaced apart from the third lower source pattern LS3. The fourth lower source pattern LS4 may be connected to each of the body portion BP of the second active pattern ACT2 and the third lower gate pattern LG3 through contact holes. Accordingly, the fourth lower source pattern LS4 may electrically connect the first transistor T1 and the fourth transistor T4. In addition, the fourth lower source pattern LS4 may be connected to the first storage electrode ST1 through an opening defined by the third intermediate gate pattern MG3. The fourth lower source pattern LS4 may be referred to as a gate connection electrode.

In an embodiment, the fourth lower source pattern LS4 may include a second capacitor electrode GD2. As the fourth lower source pattern LS4 is connected to the first storage electrode ST1, the second capacitor electrode GD2 may be connected to the first storage electrode ST1. The fourth lower source pattern LS4 may overlap the first extension portion EP1 of the second active pattern ACT2. In an embodiment, the second capacitor electrode GD2 may overlap the first capacitor electrode GD1. That is, in an area where the fourth lower source pattern LS4 and the first extension portion EP1 overlap, the first capacitor electrode GD1 and the second capacitor electrode GD2 may constitute or collectively define the gate-drain capacitor CGD.

The fifth lower source pattern LS5 may be spaced apart from the fourth lower source pattern LS4. The fifth lower source pattern LS5 may be connected to each of the second lower gate pattern LG2 and the second upper gate pattern UG2 through contact holes. The compensation gate signal may be provided to the fifth lower source pattern LS5. Accordingly, the compensation gate signal may be provided to the gate electrode of the third transistor T3.

The sixth lower source pattern LS6 may be spaced apart from the fifth lower source pattern LS5. The sixth lower source pattern LS6 may be connected to each of the first extension portion EP1 of the second active pattern ACT2 and the first active pattern of the N-th row ACT1(N) through contact holes. The sixth lower source pattern LS6 may be referred to as an active connection electrode.

The seventh lower source pattern LS7 may be spaced apart from the sixth lower source pattern LS6. The seventh lower source pattern LS7 may be connected to each of the first active pattern of the N-th row ACT1(N) and a third upper source pattern (e.g., a third upper source pattern US3 of FIG. 17) through contact holes. The seventh lower source pattern LS7 may provide the anode initialization voltage or driving current to the light emitting element (e.g., the light emitting element LD of FIG. 3). The seventh lower source pattern LS7 may be referred to as a first light emitting element connection electrode.

The eighth lower source pattern LS8 may be spaced apart from the seventh lower source pattern LS7. The eighth lower source pattern LS8 may be connected to each of the first active pattern of the N-th row ACT1(N) and a second upper source pattern (e.g., a second upper source pattern US2 of FIG. 17) through contact holes. The driving voltage (e.g., the driving voltage ELVDD of FIG. 3) may be provided to the eighth lower source pattern LS8. Accordingly, the driving voltage may be provided to each of the storage capacitor CST and the fifth transistor T5. The eighth lower source pattern LS8 may be referred to as a driving voltage connection electrode.

Figure 17:
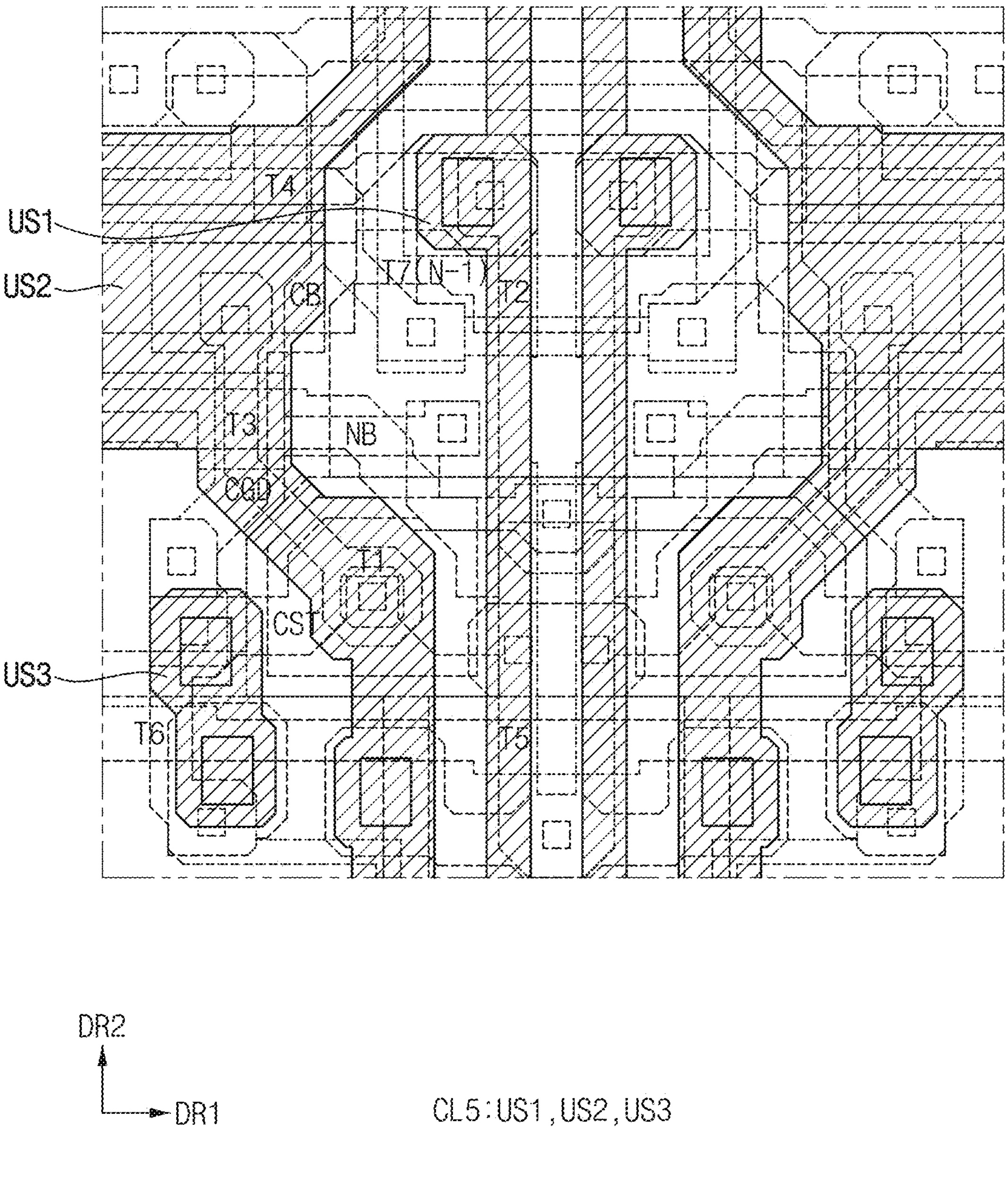

Referring further to FIG. 17, a via insulating layer (not shown) may be disposed on the fourth conductive layer CL4 and may cover the fourth conductive layer CL4.

The via insulating layer may include an organic insulating material. Examples of the organic insulating material that may be used as the via insulating layer may include photoresist, polyacryl-based resin, polyimide-based resin, acryl-based resin, or the like. These may be used alone or in combination with each other.

A fifth conductive layer CL5 may be disposed on the via insulating layer. The fifth conductive layer CL5 may include a first upper source pattern US1, a second upper source pattern US2, and a third upper source pattern US3. The first to third upper source patterns US1, US2, and US3 may be disposed on the same layer and may include the same material. The fifth conductive layer CL5 may include a metal, an alloy, a metal nitride, a conductive metal oxide, a transparent conductive material, or the like. These may be used alone or in combination with each other.

The first upper source pattern US1 may extend in the second direction DR2. The data voltage may be provided to the first upper source pattern US1. The first upper source pattern US1 may be connected to the third lower source pattern LS3 through a contact hole. Accordingly, the data voltage may be provided to the third lower source pattern LS3. The first upper source pattern US1 may be referred to as a data voltage line.

The second upper source pattern US2 may extend in the second direction DR2 and may be spaced apart from the first upper source pattern US1 in the first direction DR1. The driving voltage may be provided to the second upper source pattern US2. The second upper source pattern US2 may be connected to the eighth lower source pattern LS8 through a contact hole. Accordingly, the driving voltage may be provided to the eighth lower source pattern LS8. The second upper source pattern US2 may be referred to as a driving voltage line.

The third upper source pattern US3 may be spaced apart from the second upper source pattern US2. The third upper source pattern US3 may be connected to each of the seventh lower source pattern LS7 and the anode electrode of the light emitting element through contact holes. The third upper source pattern US3 may provide the anode initialization voltage or the driving current to the light emitting element.

The third upper source pattern US3 may be referred to as a second light emitting element connection electrode.

Figure 18:
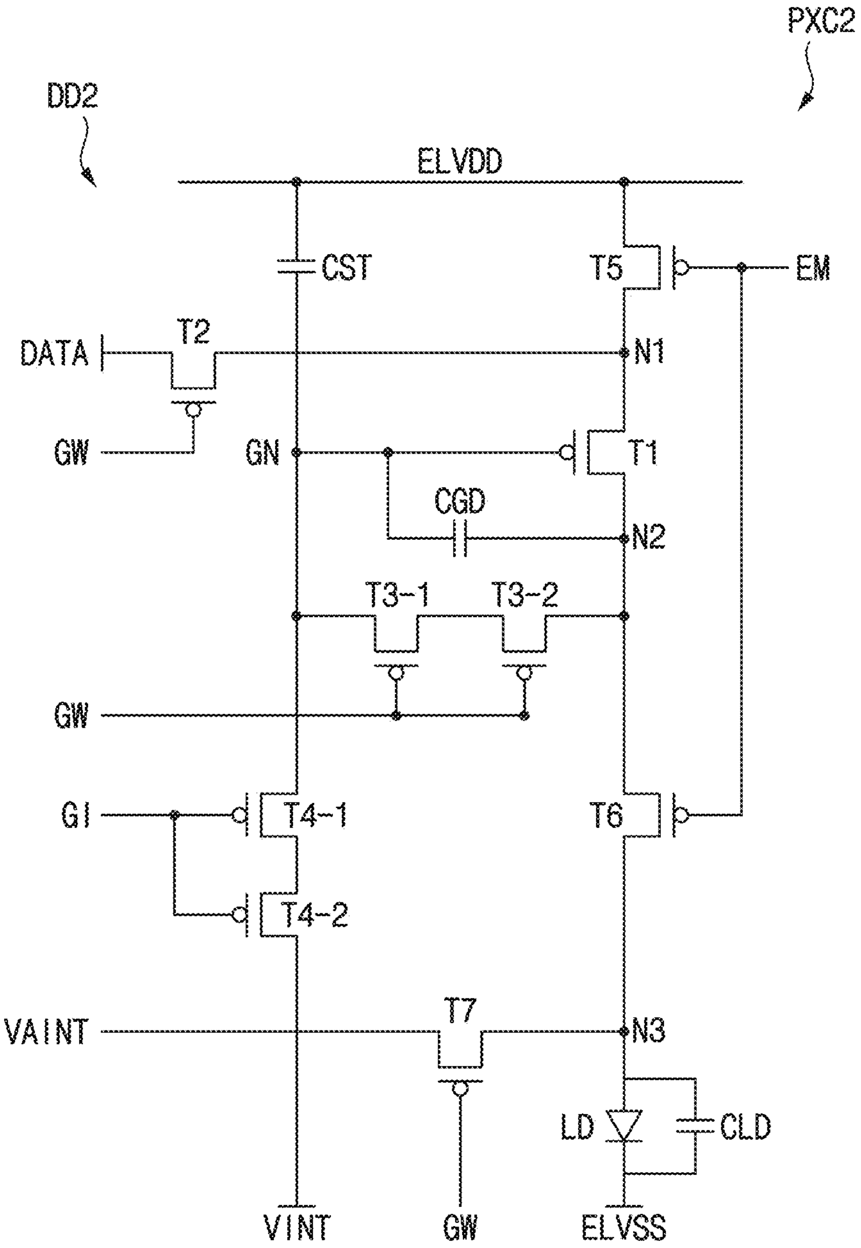
FIG. 18 is a circuit diagram illustrating a pixel included in a display device according to an alternative embodiment of the disclosure.

FIG. 18 is a circuit diagram illustrating a pixel included in a display device according to an alternative embodiment of the disclosure. Hereinafter, any repetitive detailed descriptions of the same or like elements as those described with reference to FIG. 3 will be omitted or simplified.

Referring to FIG. 18, in an alternative embodiment, each pixel PX of a display device DD2 may include a second pixel circuit PXC2. In such an embodiment, the second pixel PXC2 may include a light emitting element LD, first to seventh transistors T1, T2, T3, T4, T5, T6, and T7, a storage capacitor CST, a gate-drain capacitor CGD, and a light emitting device capacitor CLD.

The second pixel circuit PXC2 of the display device DD2 may be substantially the same as the first pixel circuit PXC1 of the display device DD described with reference to FIG. 3, except for the third transistor T3, the fourth transistor T4, and the light emitting element capacitor CLD.

The third transistor T3 may include a gate electrode, a first electrode, and a second electrode. The first electrode of the third transistor T3 may be connected to a gate node GN, and the second electrode of the third transistor T3 may be connected to a second node N2. The gate electrode of the third transistor T3 may receive a write gate signal GW. The third transistor T3 may be turned on or off in response to the write gate signal GW. While the third transistor T3 is turned on, the third transistor T3 may diode-connect the first transistor T1. In such an embodiment, the third transistor T3 may compensate for the threshold voltage of the first transistor T1.

In such an embodiment, as illustrated in FIG. 18, the third transistor T3 may include a first third transistor T3-1 and a second third transistor T3-2. The first third transistor T3-1 and the second third transistor T3-2 may be connected in series with each other. In other words, a gate electrode of the first third transistor T3-1 and a gate electrode of the second third transistor T3-2 are connected to each other, and a second electrode of the first third transistor T3-1 and a first electrode of the second third transistor T3-2 may be connected to each other. However, the disclosure is not limited thereto, and the third transistor T3 may include only one transistor.

The fourth transistor T4 may include a first fourth transistor T4-1 and the second fourth transistor T4-2. The first fourth transistor T4-1 and the second fourth transistor T4-2 may be connected in series with each other. In other words, a gate electrode of the first fourth transistor T4-1 and a gate electrode of the second fourth transistor T4-2 are connected to each other, and a second electrode of the first fourth transistor T4-1 and a first electrode of the second fourth transistor T4-2 may be connected to each other. However, the disclosure is not limited thereto, and the fourth transistor T4 may include only one transistor.

In an embodiment, each of the first to seventh transistors T1, T2, T3, T4, T5, T6, and T7 may be a PMOS transistor. Accordingly, an active pattern of each of the first to seventh transistors T1, T2, T3, T4, T5, T6, and T7 may include a silicon semiconductor doped with cations. In addition, the write gate signal GW for turning on the second transistor T2, the third transistor T3, and the seventh transistor T7 may have a low level. An initialization gate signal GI for turning on the fourth transistor T4 may have a low level. A light emitting control signal EM for turning on the fifth transistor T5 and the sixth transistor T6 may have a low level.

The light emitting device capacitor CLD may include a first electrode and a second electrode. The first electrode of the light emitting device capacitor CLD may be connected to a third node N3. The second electrode of the light emitting device capacitor CLD may receive a common voltage ELVSS. The light emitting device capacitor CLD may assist the voltage of the anode electrode of the light emitting device LD to be maintained constant for more than one frame.

FIGS. 19, 20, 21, 22, and 23 are plan views showing layers of a pixel included in the display device of FIG. 18. At least some of the components illustrated in FIGS. 19 to 23 may be connected to each other among a plurality of pixel circuits.

Figure 19:
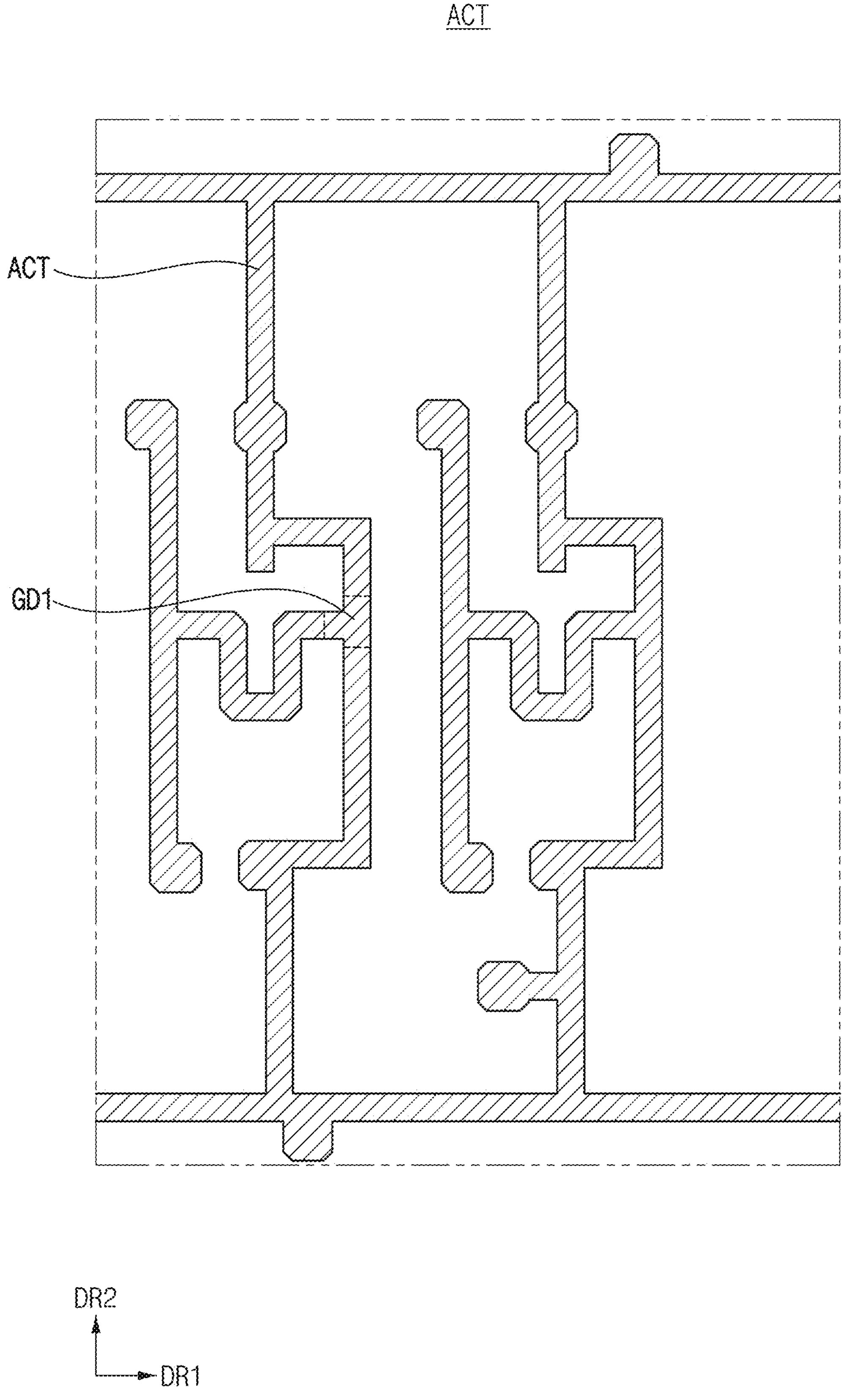
FIGS. 19, 20, 21, 22, and 23 are plan views showing layers of a pixel included in the display device of FIG. 18.

Referring to FIG. 19, the display device DD2 according to an alternative embodiment of the invention may include a substrate (e.g., the substrate SUB shown in FIG. 9) and an active pattern ACT.

The substrate may include a transparent material or an opaque material. The substrate may include or be formed of a transparent resin substrate. Examples of the transparent resin substrate may include a polyimide substrate, or the like.

The active pattern ACT may be disposed on the substrate. In an embodiment, the active pattern ACT may include a silicon semiconductor material. Examples of the silicon semiconductor material that may be used as the active pattern ACT may include amorphous silicon, polycrystalline silicon, or the like. The active pattern ACT may include a source area, a drain area, and a channel area positioned between the source area and the drain area. In an embodiment, the active pattern ACT may include a first capacitor electrode GD1.

Figure 20:
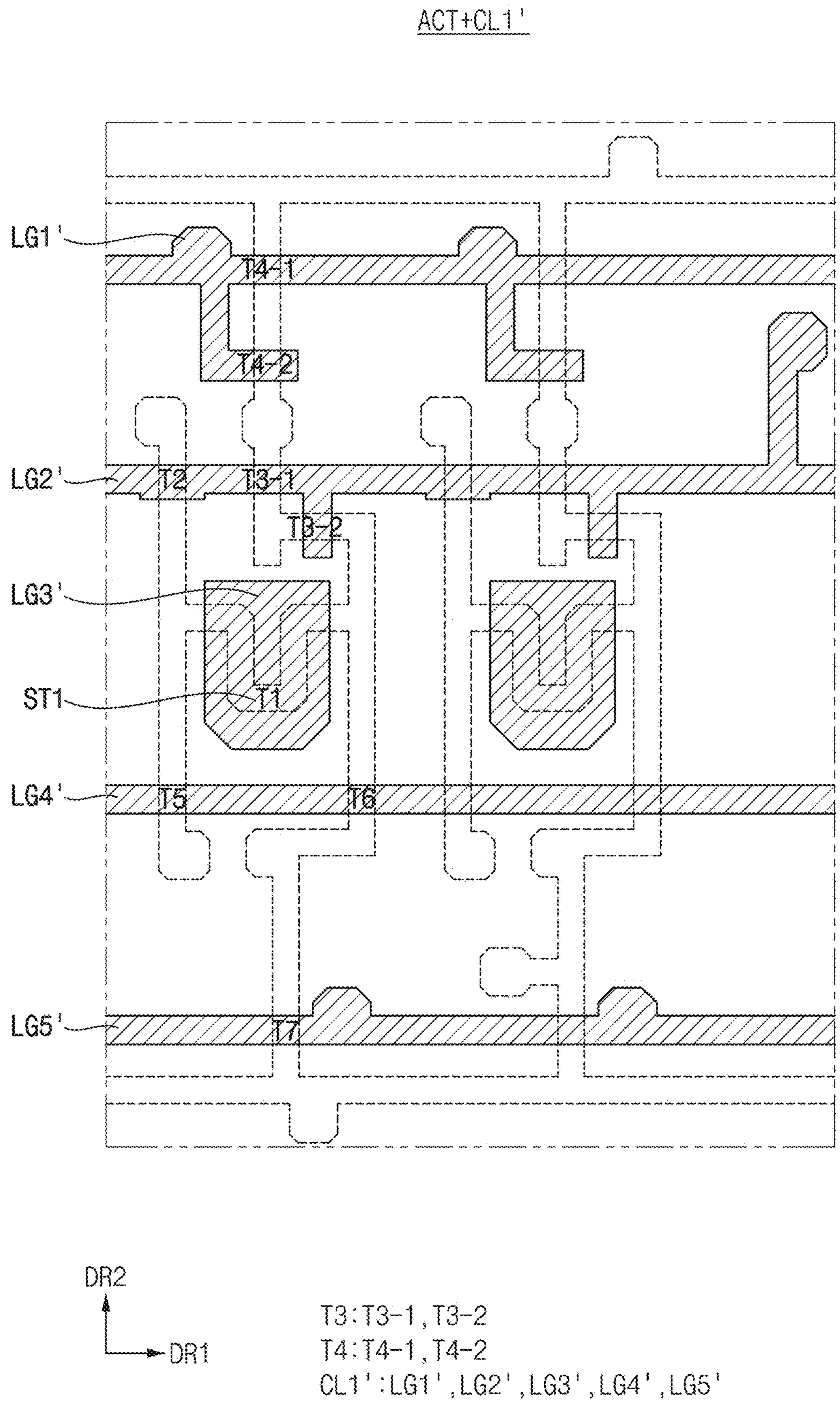

Referring further to FIG. 20, a first gate insulating layer (not shown) may be disposed on the active pattern ACT and may cover the active pattern ACT.

The first gate insulating layer may include an inorganic insulating material. Examples of the inorganic insulating material that may be used as the first gate insulating layer may include silicon oxide, silicon nitride, silicon oxynitride, or the like. These may be used alone or in combination with each other.

A first conductive layer CL1' may be disposed on the first gate insulating layer. The first conductive layer CL1' may include a first lower gate pattern LG1', a second lower gate pattern LG2', a third lower gate pattern LG3', a fourth lower gate pattern LG4', and a fifth lower gate pattern LG5'. The first to fifth lower gate patterns LG1', LG2', LG3', LG4', and LG5' may be disposed in (or directly on) a same layer as each other and include a same material as each other. The first conductive layer CL1' may include a metal, an alloy, a metal nitride, a conductive metal oxide, a transparent conductive material, or the like. These may be used alone or in combination with each other.

The first conductive layer CL1' and the active pattern ACT may at least partially overlap. An overlapping part between the first conductive layer CL1 and the active pattern ACT may constitute or collectively define a part of a transistor.

The first lower gate pattern LG1' may extend in the first direction DR1. A part of the active pattern ACT and a part of the first lower gate pattern LG1' overlapping the active pattern ACT may constitute or collectively define the fourth transistor T4. In this case, the fourth transistor T4 may include the first fourth transistor T4-1 and the second fourth transistor T4-2 connected in series with each other. In an embodiment, for example, the first lower gate pattern LG1' may correspond to each of the gate electrode of the first fourth transistor T4-1 and the gate electrode of the second fourth transistor T4-2. The initialization gate signal (e.g., the initialization gate signal GI of FIG. 18) may be provided to the first lower gate pattern LG1'.

The second lower gate pattern LG2' may extend in the first direction DR1 and may be spaced apart from the first lower gate pattern LG1' in the second direction DR2. A part of the active pattern ACT and a part of the second lower gate pattern LG2' overlapping the active pattern ACT may constitute or collectively define the second transistor T2 and the third transistor T3. In such an embodiment, the third transistor T3 may include the first third transistor T3-1 and the second third transistor T3-2 connected in series with each other. In an embodiment, for example, the second lower gate pattern LG2' may correspond to each of the gate electrodes of the second transistor T2, the first third transistor T3-1, and the second third transistor T3-2. The write gate signal (e.g., the write gate signal GW of FIG. 18) may be provided to the second lower gate pattern LG2'.

The third lower gate pattern LG3' may be spaced apart from the second lower gate pattern LG2' in the second direction DR2. The third lower gate pattern LG3' may have an island shape on a plane. A part of the active pattern ACT and a part of the third lower gate pattern LG3' overlapping the active pattern ACT may constitute or collectively define the first transistor T1. In an embodiment, for example, the third lower gate pattern LG3' may correspond to the gate electrode of the first transistor T1. In an embodiment, the third lower gate pattern LG3' may include a first storage electrode ST1.

The fourth lower gate pattern LG4' may extend in the first direction DR1 and may be spaced apart from the third lower gate pattern LG3' in the second direction DR2. A part of the active pattern ACT and a part of the fourth lower gate pattern LG4' overlapping the active pattern ACT may constitute or collectively define the fifth transistor T5 and the sixth transistor T6. In an embodiment, for example, the fourth lower gate pattern LG4' may correspond to each of the gate electrodes of the fifth and sixth transistors T5 and T6. The light emitting control signal (e.g., the light emitting control signal EM of FIG. 18) may be provided to the fourth lower gate pattern LG4'.

The fifth lower gate pattern LG5' may extend in the first direction DR1 and may be spaced apart from the fourth lower gate pattern LG4' in the second direction DR2. A part of the active pattern ACT and a part of the fifth lower gate pattern LG5' overlapping the active pattern ACT may constitute or collectively define the seventh transistor T7. In an embodiment, for example, the fifth lower gate pattern LG5' may correspond to the gate electrode of the seventh transistor T7. The write gate signal may be provided to the fifth lower gate pattern LG5'.

Figure 21:
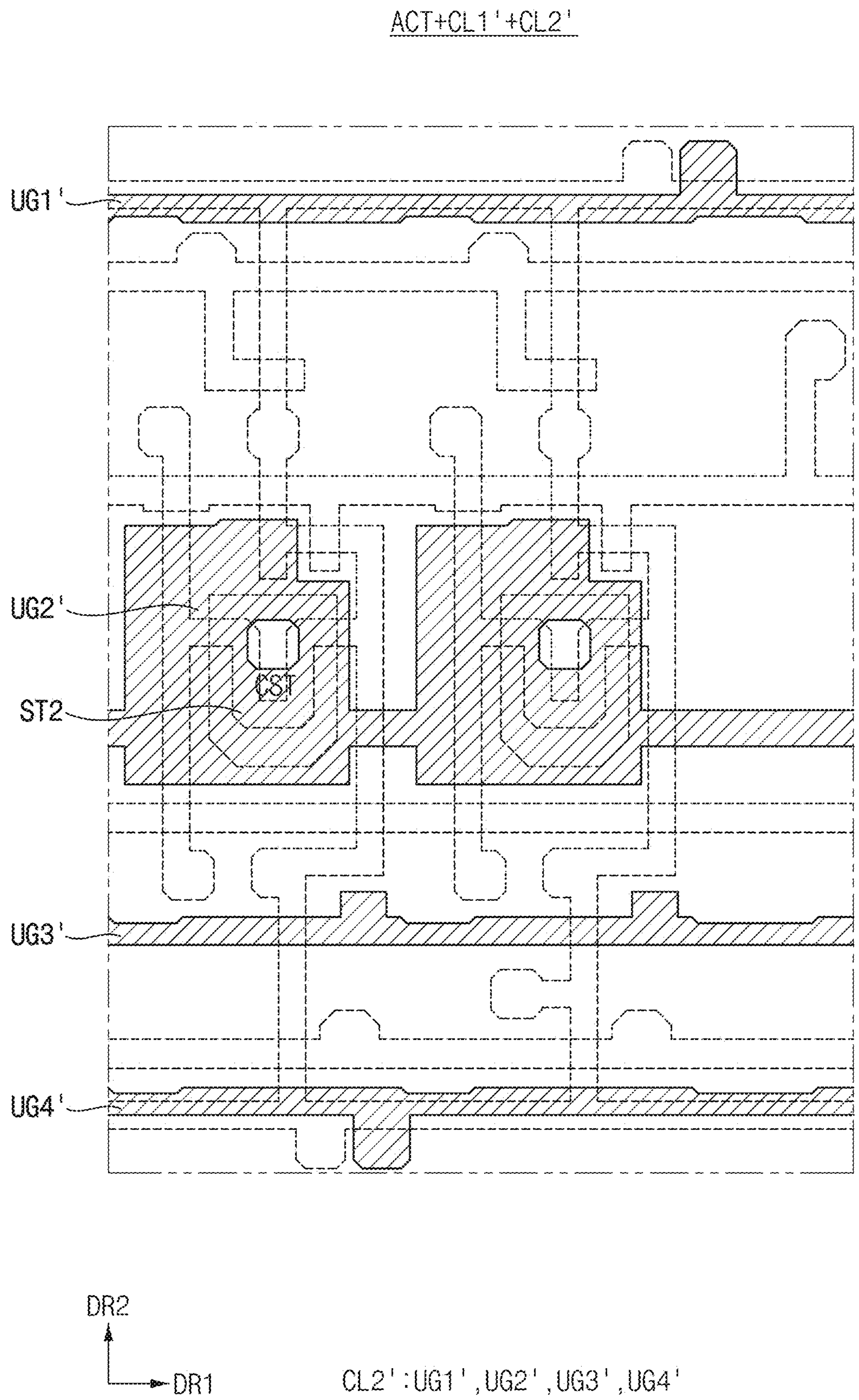

Referring further to FIG. 21, a second gate insulating layer (not shown) may be disposed on the first conductive layer CL1' and may cover the first conductive layer CL1'.

The second gate insulating layer may include an inorganic insulating material. Examples of the inorganic insulating material that may be used as the second gate insulating layer may include silicon oxide, silicon nitride, silicon oxynitride, or the like. These may be used alone or in combination with each other.

A second conductive layer CL2' may be disposed on the second gate insulating layer. The second conductive layer CL2' may include a first upper gate pattern UG1', a second upper gate pattern UG2', a third upper gate pattern UG3', and a fourth upper gate pattern UG4'. The first to fourth upper gate patterns UG1', UG2', UG3', and UG4' may be disposed in (or directly on) a same layer as each other and include a same material as each other. The second conductive layer CL2' may include a metal, an alloy, a metal nitride, a conductive metal oxide, a transparent conductive material, or the like. These may be used alone or in combination with each other.

The first upper gate pattern UG1' may extend in the first direction DR1. The gate initialization voltage (e.g., the gate initialization voltage VINT of FIG. 18) may be provided to the first upper gate pattern UG1'. The first upper gate pattern UG1' may be referred to as a first gate initialization voltage line.

The second upper gate pattern UG2' may be spaced apart from the first upper gate pattern UG1' in the second direction DR2. The second upper gate pattern UG2' may include a second storage electrode ST2. The second upper gate pattern UG2' may overlap the third lower gate pattern LG3' on a plane. In an embodiment, the second storage electrode ST2 may overlap the first storage electrode ST1. In such an embodiment, in an area where the second upper gate pattern UG2' and the third lower gate pattern LG3' overlap, the first storage electrode ST1 and the second storage electrode ST2 may constitute or collectively define the storage capacitor CST. In an embodiment, an opening exposing an upper surface of the third lower gate pattern LG3' may be defined in the second upper gate pattern UG2'.

The third upper gate pattern UG3' may extend in the first direction DR1 and may be spaced apart from the second upper gate pattern UG2' in the second direction DR2. The third upper gate pattern UG3' may increase the yield of the display device. In an embodiment, for example, when defects occur in some of lines in the manufacturing process of the display device, the third upper gate pattern UG3' may replace some of the lines.

The fourth upper gate pattern UG4' may extend in the first direction DR1 and may be spaced apart from the third upper gate pattern UG3' in the second direction DR2. The anode initialization voltage (e.g., the anode initialization voltage VAINT of FIG. 18) may be provided to the fourth upper gate pattern UG4'. The fourth upper gate pattern UG4' may be referred to as an anode initialization voltage line.

Figure 22:
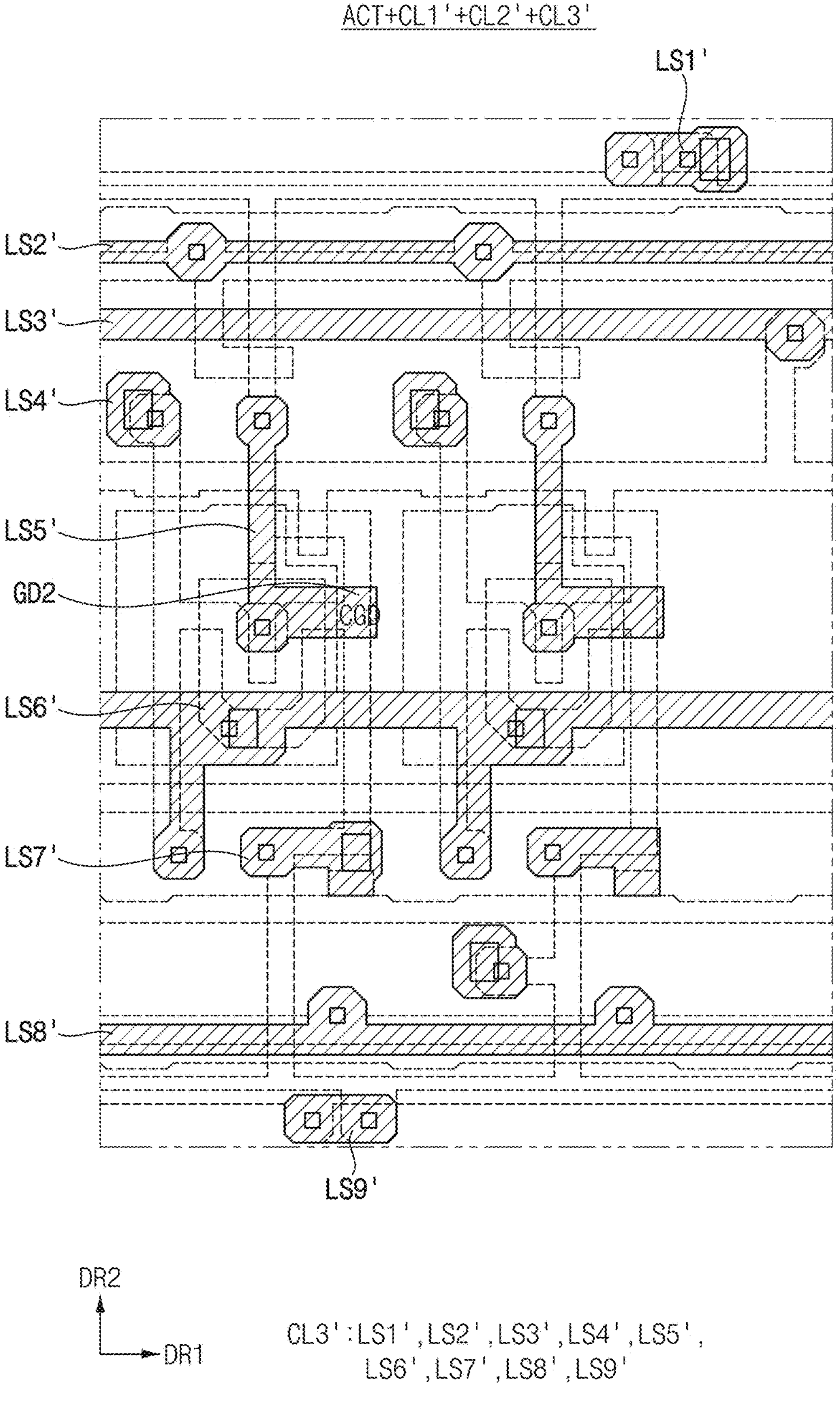

Referring further to FIG. 22, an inter-layer insulating layer (not shown) may be disposed on the second conductive layer CL2' and may cover the second conductive layer CL2'

The inter-layer insulating layer may include an inorganic insulating material. Examples of the inorganic insulating material that may be used as the inter-layer insulating layer may include silicon oxide, silicon nitride, silicon oxynitride, or the like. These may be used alone or in combination with each other.

A third conductive layer CL3' may be disposed on the interlayer insulating layer. The third conductive layer CL3' may include first to ninth lower source patterns LS1', LS2', LS3', LS4', LS5', LS6', LS7', LS8', and LS9'. The first to ninth lower source patterns LS1', LS2', LS3', LS4', LS5', LS6', LS7', LS8', and LS9' may be disposed in (or directly on) a same layer as each other and include a same material as each other. The third conductive layer CL3' may include a metal, an alloy, a metal nitride, a conductive metal oxide, a transparent conductive material, or the like. These may be used alone or in combination with each other.

The first lower source pattern LS1' may extend in the first direction DR1. The first lower source pattern LS1' may be connected to each of the active pattern ACT, the first upper gate pattern UG1', and a fourth upper source pattern (e.g., a fourth upper source pattern US4 of FIG. 23) through contact holes. The gate initialization voltage may be provided to the first lower source pattern LS1'. Accordingly, the gate initialization voltage may be provided to the fourth transistor T4. The first lower source pattern LS1' may be referred to as a gate initialization voltage connection electrode.

The second lower source pattern LS2' may extend in the first direction DR1 and may be spaced apart from the first lower source pattern LS1'. The initialization gate signal may be provided to the second lower source pattern LS2'. The second lower source pattern LS2' may be connected to the first lower gate pattern LG1' through a contact hole. Accordingly, the initialization gate signal may be provided to the gate electrode of the fourth transistor T4. The second lower source pattern LS2' may be referred to as an initialization gate line.

The third lower source pattern LS3' may extend in the first direction DR1 and may be spaced apart from the second lower source pattern LS2'. The write gate signal may be provided to the third lower source pattern LS3'. The third lower source pattern LS3' may be connected to the second lower gate pattern LG2' through a contact hole. Accordingly, the write gate signal may be provided to each of the gate electrode of the second transistor T2 and the gate electrode of the third transistor T3. The third lower source pattern LS3' may be referred to as a first write gate line.

The fourth lower source pattern LS4' may be spaced apart from the third lower source pattern LS3'. The fourth lower source pattern LS4' may be connected to each of the active pattern ACT and a first upper source pattern (e.g., a first upper source pattern US1' of FIG. 23) through contact holes. The data voltage (e.g., the data voltage VDATA of FIG. 18) may be provided to the fourth lower source pattern LS4'. Accordingly, the data voltage may be provided to the second transistor T2. The fourth lower source pattern LS4' may be referred to as a data voltage connection electrode.

The fifth lower source pattern LS5' may be spaced apart from the fourth lower source pattern LS4'. The fifth lower source pattern LS5' may be connected to each of the active pattern ACT and the third lower gate pattern LG3' through contact holes. In addition, the fifth lower source pattern LS5' may be connected to the first storage electrode ST1 through an opening defined by the second upper gate pattern UG2'. The fifth lower source pattern LS5' may be referred to as a gate connection electrode.

In an embodiment, the fifth lower source pattern LS5' may include a second capacitor electrode GD2. As the fifth lower source pattern LS5' is connected to the first storage electrode ST1, the second capacitor electrode GD2 may be connected to the first storage electrode ST1. The fifth lower source pattern LS5' may overlap a part of the active pattern ACT. In an embodiment, the second capacitor electrode GD2 may overlap the first capacitor electrode GD1. In such an embodiment, in an area where the fifth lower source pattern LS5' and the active pattern ACT overlap, the first capacitor electrode GD1 and the second capacitor electrode GD2 may constitute or collectively define the gate-drain capacitor CGD.

The sixth lower source pattern LS6' may extend in the first direction DR1 and may be spaced apart from the fifth lower source pattern LS5'. The sixth lower source pattern LS6' may be connected to each of the active pattern ACT and a second upper source pattern (e.g., a second upper source pattern US2' of FIG. 23) through contact holes. The driving voltage (e.g., the driving voltage ELVDD of FIG. 18) may be provided to the sixth lower source pattern LS6'. Accordingly, the driving voltage may be provided to each of the storage capacitor CST and the fifth transistor T5. The sixth lower source pattern LS6' may be referred to as a driving voltage connection electrode.

The seventh lower source pattern LS7' may be spaced apart from the sixth lower source pattern LS6'. The seventh lower source pattern LS7' may be connected to each of the active pattern ACT and a third upper source pattern (e.g., a third upper source pattern US3' of FIG. 23) through contact holes. The seventh lower source pattern LS7' may provide the anode initialization voltage or driving current to the light emitting element (e.g., the light emitting element LD of FIG. 18). The seventh lower source pattern LS7' may be referred to as a first light emitting element connection electrode.

The eighth lower source pattern LS8' may extend in the first direction DR1 and may be spaced apart from the seventh lower source pattern LS7'. The write gate signal may be provided to the eighth lower source pattern LS8'. The eighth lower source pattern LS8' may be connected to the fifth lower gate pattern LG5' through a contact hole. Accordingly, the write gate signal may be provided to the gate electrode of the seventh transistor T7. The eighth lower source pattern LS8' may be referred to as a second write gate line.

The ninth lower source pattern LS9' may extend in the first direction DR1 and may be spaced apart from the eighth lower source pattern LS8'. The ninth lower source pattern LS9' may be connected to each of the active pattern ACT and the fourth upper gate pattern UG4' through contact holes. The anode initialization voltage may be provided to the ninth lower source pattern LS9'. Accordingly, the anode initialization voltage may be provided to the seventh transistor T7. The ninth lower source pattern LS9' may be referred to as an anode initialization voltage connection electrode.

Figure 23:
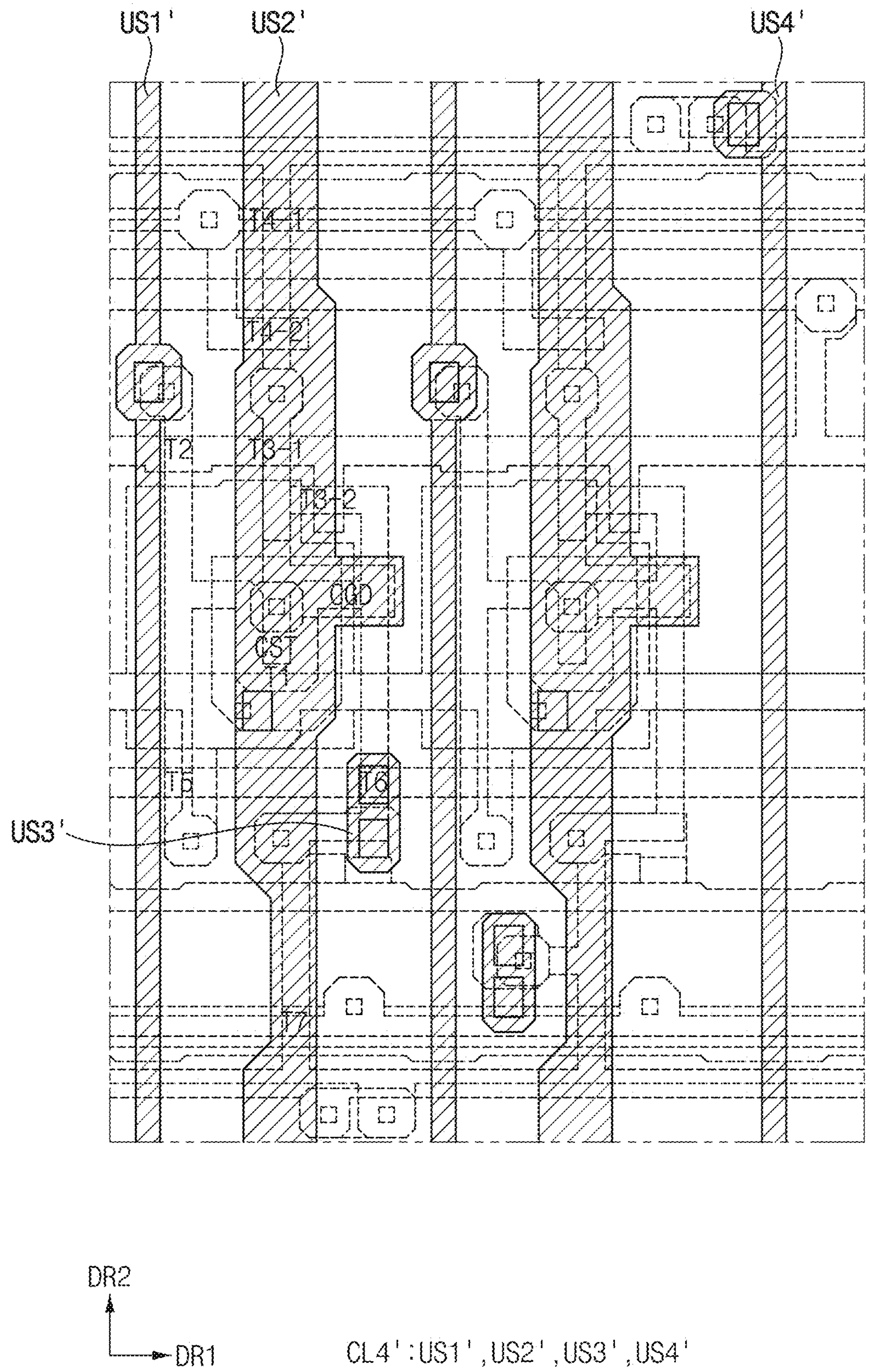

Referring further to FIG. 23, a via insulating layer (not shown) may be disposed on the third conductive layer CL3' and may cover the third conductive layer CL3'.

The via insulating layer may include an organic insulating material. Examples of the organic insulating material that may be used as the via insulating layer may include photoresist, polyacrylic resin, polyimide resin, acrylic resin, or the like. These may be used alone or in combination with each other.

A fourth conductive layer CL4' may be disposed on the via insulation layer. The fourth conductive layer CL4' may include a first upper source pattern US1', a second upper source pattern US2', a third upper source pattern US3', and a fourth upper source pattern US4'. The first to fourth upper source patterns US1', US2', US3', and US4' may be disposed in (or directly on) a same layer as each other and may include a same material as each other. The fourth conductive layer CL4' may include a metal, an alloy, a metal nitride, a conductive metal oxide, a transparent conductive material, or the like. These may be used alone or in combination with each other.

The first upper source pattern US1' may extend in the second direction DR2. The data voltage may be provided to the first upper source pattern US1'. The first upper source pattern US1' may be connected to the fourth lower source pattern LS4' through a contact hole. Accordingly, the data voltage may be provided to the fourth lower source pattern LS4'. The first upper source pattern US1' may be referred to as a data voltage line.

The second upper source pattern US2' may extend in the second direction DR2 and may be spaced apart from the first upper source pattern US1' in the first direction DR1. The driving voltage may be provided to the second upper source pattern US2'. The second upper source pattern US2' may be connected to the sixth lower source pattern LS6' through a contact hole. Accordingly, the driving voltage may be provided to the sixth lower source pattern LS6'. The second upper source pattern US2' may be referred to as a driving voltage line.

The third upper source pattern US3' may be spaced apart from the second upper source pattern US2'. The third upper source pattern US3' may be connected to each of the seventh lower source pattern LS7' and the anode electrode of the light emitting element through contact holes. The third upper source pattern US3' may provide the anode initialization voltage or the driving current to the light emitting element. The third upper source pattern US3' may be referred to as a second light emitting element connection electrode.

The fourth upper source pattern US4' may extend in the second direction DR2 and may be spaced apart from the third upper source pattern US3'. The gate initialization voltage may be provided to the fourth upper source pattern US4'. The fourth upper source pattern US4' may be connected to the first lower source pattern LS1' through a contact hole. Accordingly, the gate initialization voltage may be provided to the first lower source pattern LS1'. The fourth upper source pattern US4' may be referred to as a second gate initialization voltage line.

Embodiments of the disclosure can be applied to various display devices, such as display devices for vehicles, ships and aircraft, portable communication devices, display devices for exhibition or information transmission, medical display devices, and the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:

a driving transistor which generates a driving current, wherein the driving transistor includes a first electrode connected to a first node, a gate electrode connected to a gate node, and a second electrode connected to a second node;

a writing transistor connected to the driving transistor through the first node, wherein the writing transistor includes a first electrode which receives a data voltage, a gate electrode which receives a write gate signal, and a second electrode connected to the first node;

a compensation transistor including a gate electrode, a first electrode connected to the gate node, and a second electrode connected to the second node;

a gate-drain capacitor connected in parallel with the compensation transistor, wherein the gate-drain capacitor includes a first electrode connected to the gate node and a second electrode connected to the second node; and a light emitting element which emits light based on the driving current, wherein the gate-drain capacitor lowers a voltage of the gate node by a first change amount in a first mode in which the light emitting element is driven in a first gradation, the gate-drain capacitor lowers the voltage of the gate node by a second change amount in a second mode in which the light emitting element is driven in a second gradation greater than the first gradation, and the first change amount is greater than the second change amount.

2. The pixel circuit of claim 1, further comprising:

a first light emitting transistor including a first electrode which receives a driving voltage, a gate electrode which receives a light emitting control signal, and a second electrode connected to the first node; and a second light emitting transistor including a first electrode connected to the second node, a gate electrode which receives the light emitting control signal, and a second electrode connected to a third node, wherein the first light emitting transistor is connected to the driving transistor through the first node, and the second light emitting transistor is connected to the gate-drain capacitor through the second node.

3. The pixel circuit of claim 2, further comprising:

an anode initialization transistor including a first electrode which receives an anode initialization voltage, a gate electrode which receives the write gate signal, and a second electrode connected to the third node; and a storage capacitor including a first electrode which receives the driving voltage and a second electrode connected to the gate node, wherein the anode initialization transistor is connected to the light emitting element through the third node, and the storage capacitor is connected to the gate-drain capacitor through the gate node.

4. The pixel circuit of claim 3, further comprising:

a gate initialization transistor including a first electrode which receives a gate initialization voltage, a gate electrode which receives an initialization gate signal, and a second electrode connected to the gate node, wherein the gate initialization transistor is connected to the gate-drain capacitor through the gate node.

5. The pixel circuit of claim 4, wherein the gate electrode of the compensation transistor receives the write gate signal, and each of the compensation transistor and the gate initialization transistor is a P-channel metal oxide semiconductor transistor.

6. The pixel circuit of claim 4, wherein the gate electrode of the compensation transistor receives a compensation gate signal, and each of the compensation transistor and the gate initialization transistor is an N-channel metal oxide semiconductor transistor.

7. The pixel circuit of claim 6, further comprising:

a boost capacitor including a first electrode which receives the write gate signal and a second electrode connected to the gate node; and a negative boost capacitor including a first electrode which receives the compensation gate signal and a second electrode connected to the gate node, wherein the boost capacitor is connected to the gate-drain capacitor through the gate node, and the negative boost capacitor is connected to the gate-drain capacitor through the gate node.

8. A display device comprising:

a substrate;

a first active pattern disposed on the substrate;

a first conductive layer disposed on the first active pattern and including a first storage electrode;

a second conductive layer disposed on the first conductive layer and including a second storage electrode overlapping the first storage electrode;

a second active pattern disposed on the second conductive layer and including a first capacitor electrode;

a third conductive layer disposed on the second active pattern; and a fourth conductive layer disposed on the third conductive layer and including a second capacitor electrode connected to the first storage electrode.

9. The display device of claim 8, wherein the second capacitor electrode overlaps the first capacitor electrode, and the first capacitor electrode and the second capacitor electrode collectively define a gate-drain capacitor.

10. The display device of claim 9, wherein the first conductive layer further includes a first boost electrode, the second active pattern further includes a second boost electrode overlapping the first boost electrode, and the first boost electrode and the second boost electrode collectively define a boost capacitor.

11. The display device of claim 9, wherein the first conductive layer further includes a first negative boost electrode, the third conductive layer further includes a second negative boost electrode overlapping the first negative boost electrode, and the first negative boost electrode and the second negative boost electrode collectively define a negative boost capacitor.

12. The display device of claim 9, wherein the first storage electrode and the second storage electrode collectively define a storage capacitor.

13. The display device of claim 9, wherein the first active pattern includes a silicon semiconductor, and the second active pattern includes an oxide semiconductor.

* * * * *